(12) United States Patent
Fujita et al.

(10) Patent No.: US 10,486,735 B2
(45) Date of Patent: Nov. 26, 2019

(54) ROTATION DETECTING APPARATUS

(71) Applicant: DENSO CORPORATION, Kariya, Aichi-pref. (JP)

(72) Inventors: Toshihiro Fujita, Kariya (JP); Takaharu Kozawa, Kariya (JP); Shuhei Miyachi, Kariya (JP); Katsuhiko Hayashi, Kariya (JP); Shuji Kuramitsu, Kariya (JP); Koichi Nakamura, Kariya (JP); Yuki Watanabe, Kariya (JP); Atsuko Oka, Kariya (JP); Masaya Taki, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 108 days.

(21) Appl. No.: 15/891,720

(22) Filed: Feb. 8, 2018

(65) Prior Publication Data

US 2018/0229761 A1    Aug. 16, 2018

(30) Foreign Application Priority Data

Feb. 10, 2017  (JP) .................................. 2017-023441

(51) Int. Cl.
*A01B 69/00* (2006.01)
*B62D 5/04* (2006.01)
(Continued)

(52) U.S. Cl.
CPC ............. *B62D 5/046* (2013.01); *B62D 5/049* (2013.01); *B62D 5/0487* (2013.01);
(Continued)

(58) Field of Classification Search
CPC .... B62D 5/046; B62D 5/0487; H02P 29/0241
See application file for complete search history.

(56) References Cited

U.S. PATENT DOCUMENTS 9,657,774 B2 *  5/2017  Kozaki ............... F16C 32/0489
9,772,249 B2 *  9/2017  Yamano ............... B62D 5/0463
(Continued)

FOREIGN PATENT DOCUMENTS

| JP | 2018-129995 | 8/2018 |
| JP | 2018-129996 | 8/2018 |
| JP | 2018-130007 | 8/2018 |

*Primary Examiner* — Adam M Alharbi
(74) *Attorney, Agent, or Firm* — Knobbe, Martens, Olson & Bear, LLP

(57) ABSTRACT

In a rotation detecting apparatus, while a switch is in an on state so that electrical power is supplied from a power source to a controller via the switch, the controller receives, as a first output signal, an output signal output from an output unit of a first rotation sensor, and receives, as a second output signal, an output signal output from an output unit of the second rotation sensor. The first output signal includes at least the first rotational information and the second rotational information based on the first rotation sensor, and the second output signal includes at least the first rotational information and the second rotational information based on the second rotation sensor. The controller determines whether there is a malfunction in each of the first and second rotation sensors as a function of the first output signal and the second output signal.

16 Claims, 10 Drawing Sheets

(51) Int. Cl.
*B62D 15/02* (2006.01)
*G01B 7/30* (2006.01)
*G01L 5/22* (2006.01)
*G01D 3/08* (2006.01)
*H02P 6/16* (2016.01)
*H02P 29/024* (2016.01)
*H02P 27/06* (2006.01)
*G01D 5/14* (2006.01)

(52) U.S. Cl.
CPC ........... *B62D 15/0235* (2013.01); *G01B 7/30* (2013.01); *G01D 3/08* (2013.01); *G01L 5/221* (2013.01); *H02P 6/16* (2013.01); *H02P 29/0241* (2016.02); *B62D 5/0406* (2013.01); *G01D 5/145* (2013.01); *H02P 27/06* (2013.01)

(56) References Cited

U.S. PATENT DOCUMENTS

| | | | |
|---|---|---|---|
| 9,889,839 B2* | 2/2018 | Iwagami | F02D 41/0215 |
| 2015/0239501 A1 | 8/2015 | Fujita et al. | |
| 2017/0291640 A1 | 10/2017 | Fujita et al. | |

* cited by examiner

FIG.4A

| RUN-COUNTER | $\theta m\_pk$ | $\theta m\_qk$ | $Tc\_pk$ | STATUS | CRC |
|---|---|---|---|---|---|

FIG.4B

| RUN-COUNTER | $\theta m\_pk$ | $\theta m\_qk$ | $Tc\_pk$ | $Tc\_qk$ | STATUS | CRC |
|---|---|---|---|---|---|---|

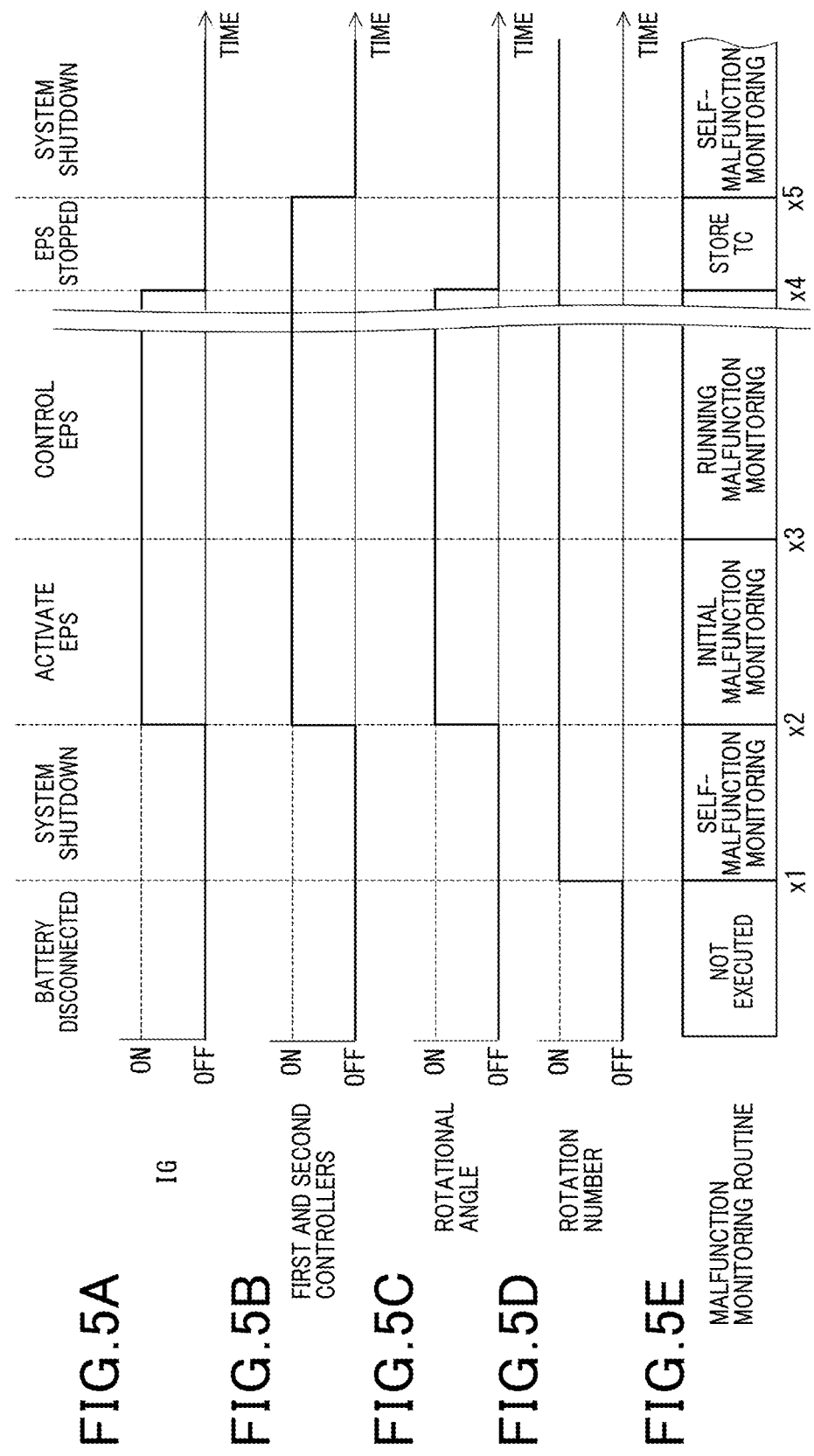

ROTATION DETECTING APPARATUS

CROSS REFERENCE TO RELATED APPLICATIONS

This application is based on and claims the benefit of priority from Japanese Patent Application 2017-23441 filed on Feb. 10, 2017, the disclosure of which is incorporated in its entirety herein by reference.

TECHNICAL FIELD

The present disclosure relates to rotation detecting apparatuses.

BACKGROUND

Conventional rotation detecting apparatuses detect a rotational angle of a motor and the number of rotations of the motor. For example, Japanese Patent Publication No. 5958572, which will be referred to as a published patent document, discloses an example of these conventional rotation detecting apparatuses.

Specifically, the conventional rotation detecting apparatus disclosed in the published patent document, which is installed in a vehicle, is activated upon a power supply switch, i.e. an ignition switch, of the vehicle being in an on state so that electrical power is supplied from a power source to the conventional rotation detecting apparatus via the ignition switch.

The conventional rotation detecting apparatus includes a rotation sensor that obtains a measurement signal related to rotations of the motor. The conventional rotation detecting apparatus calculates, based on the measurement signal obtained by the rotation sensor, first rotation-related information indicative of a rotational angle of the motor upon the ignition switch of the vehicle being in the on state.

The conventional rotation detecting apparatus therefore stops calculation of the first rotation-related information upon the ignition switch being in an off state, because no electrical power is supplied from the power source to the conventional rotation detecting apparatus.

The conventional rotation detecting apparatus disclosed in the published patent document also calculates, based on the measurement signal obtained by the rotation sensor, second rotation-related information indicative of the number of rotations of the motor using electrical power supplied from the power source independently of the on/off state of the ignition switch.

This configuration of the conventional rotation detecting apparatus aims to reduce power consumption of the conventional rotation detecting apparatus upon the ignition switch being in the off state.

SUMMARY

The conventional rotation detecting apparatus disclosed in the published patent document may have difficulty in monitoring whether there is a malfunction in the rotation sensor during the ignition switch being off.

In view of the circumstances, an exemplary aspect of the present disclosure seeks to provide rotation detecting apparatuses, each of which is capable of addressing the problem set forth above, and more specifically reliably monitoring whether there is a malfunction in a rotation sensor even if a switch for power supply of the rotation sensor is in the off state.

According to an exemplary aspect of the present disclosure, there is provided a rotation detecting apparatus. The rotation detecting apparatus includes at least first and second rotation sensors. Each of the first and second rotation sensors includes a sensor element configured to output a measurement value indicative of rotation of a measurement target, and a first calculator. The first calculator is configured to calculate first rotation information about rotation of the measurement target in accordance with the measurement value of the sensor element while a switch is in an on state so that electrical power is supplied from a power source to the first calculator via the switch, and stop calculation of the first rotation information while the switch is in an off state. Each of the first and second rotation sensors includes a second calculator configured to calculate second rotation information about rotation of the measurement target in accordance with the measurement value of the sensor element independently of the on state or off state of the switch. The second rotation information is different from the first rotational information. Each of the first and second rotation sensors includes an output unit configured to generate an output signal including at least the first rotational information and the second rotational information, and output the output signal. The rotation detecting apparatus includes a controller configured to, while the switch is in the on state, receive, as a first output signal, the output signal output from the output unit of the first rotation sensor, and receive, as a second output signal, the output signal output from the output unit of the second rotation sensor. The controller is configured to monitor whether there is a malfunction in each of the first rotation sensor and the second rotation sensor as a function of the first output signal and the second output signal.

This configuration of the rotation detecting apparatus makes it possible to reliably monitor whether there is a malfunction in each of the first and second rotation sensors even, for example, during the switch being off as a function of, for example, the second rotational information included in the first output signal and the second rotational information included in the second output signal.

BRIEF DESCRIPTION OF THE DRAWINGS

Other aspects of the present disclosure will become apparent from the following description of embodiments with reference to the accompanying drawings in which:

FIG. 4A is a view schematically illustrating an example of the structure of a communication frame of an output signal according to the first embodiment;

FIG. 4B is a view schematically illustrating an example of the structure of the communication frame of the output signal according to the fourth embodiment of the present disclosure described later;

FIGS. 5A to 5E are a joint timing chart schematically illustrating how a malfunction monitoring routine is carried out by the motor control apparatus;

DETAILED DESCRIPTION OF EMBODIMENT

Figure 1:
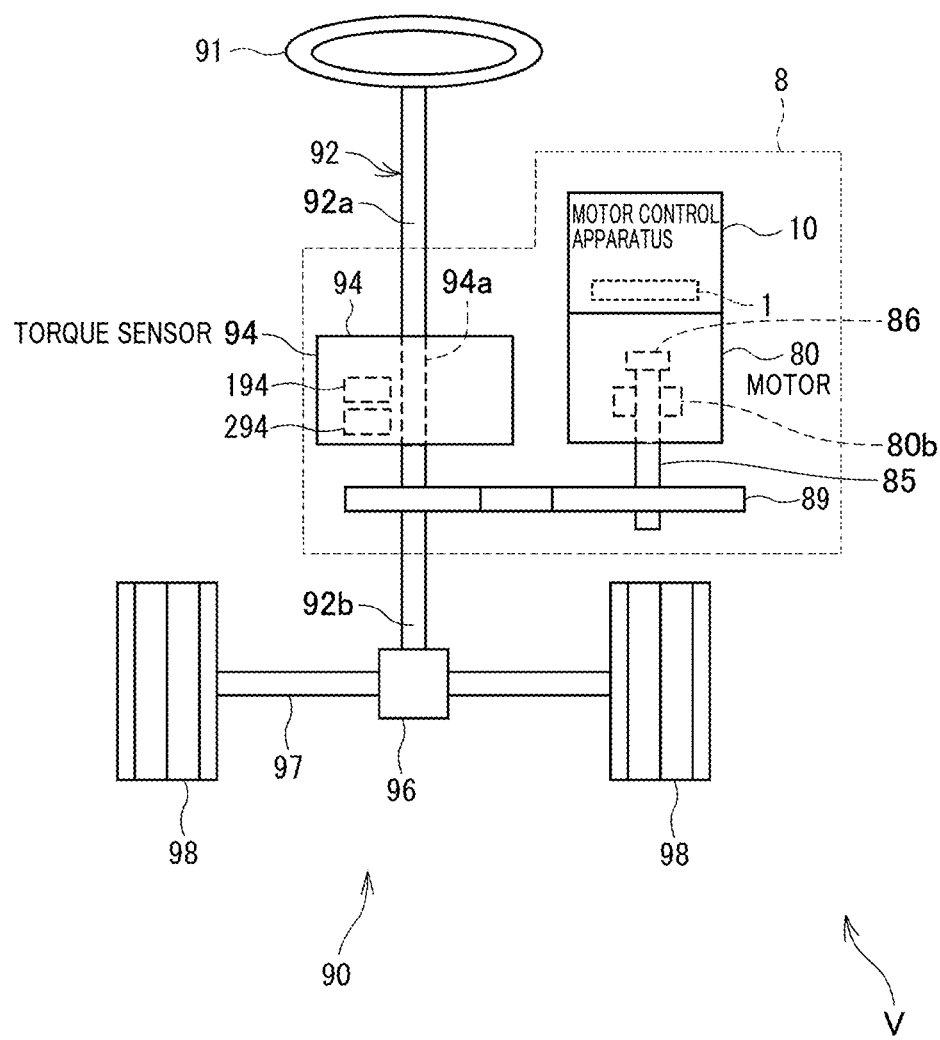
FIG. 1 is a structural diagram schematically illustrating a steering system according to the first embodiment of the present disclosure.

The following describes preferred embodiments of the present disclosure with reference to the accompanying drawings. In the embodiments, like parts between the embodiments, to which like reference characters are assigned, are omitted or simplified to avoid redundant description.

First Embodiment

The following describes a rotation detecting apparatus 1 according to the first embodiment of the present disclosure with reference to FIGS. 1 to 7.

Referring to FIG. 1, the rotation detecting apparatus 1 according to the first embodiment is installed in, for example, an electric power steering apparatus 8 installed in a steering system 90; the steering system 90 is installed in a vehicle V. The electric power steering apparatus 8 is operative to assist a driver's steering operation of a steering wheel 91 of the vehicle V.

In particular, FIG. 1 schematically illustrates an example of the overall structure of the steering system 90 including the electric power steering apparatus 8. The steering system 90 is comprised of, for example, a steering wheel 91 as a driver's operation member, a steering shaft 92, a torque sensor 94, a pinion gear 96, a rack axle 97, wheels 98, and the electric power steering apparatus 8.

The steering shaft 92 is comprised of, for example, a first portion, i.e. an upper portion, 92a and a second portion, i.e. a lower portion, 92b. Each of the first and second portions 92a and 92b of the steering shaft 92 also has opposing first and second ends.

The steering wheel 91 is connected to the first end of the first portion 92a of the steering shaft 92. The torque sensor 94 is mounted to the steering shaft 92; the torque sensor 94 is operative to measure torque based on a driver's steering operation of the steering shaft 92 as steering torque, and output a measurement signal indicative of the measured torque. The torque sensor 94 includes a torsion bar 94a having opposing first and second ends. The second end of the first portion 92a of the steering shaft 92 is coaxially connected to the first end of the torsion bar 94a, and the second end of the torsion bar 94a is coaxially connected to the first end of the second portion 92b of the steering shaft 92. The pinion gear 96 is mounted to the second end of the second portion 92b of the steering shaft 92.

The torque sensor 94 for example includes a first sensor portion 194 and a second sensor portion 294. Each of the first and second sensor portions 194 and 294 measures the twist of the torsion bar 94a based on a driver's steering operation of the steering shaft 92 as steering torque.

The rack axle 97 includes a rod-shaped rack with which the pinion gear 96 is engaged. The rack axle 97 also includes first and second tie rods each having opposing first and second ends. The first end of each of the first and second tie rods is coupled to a corresponding one of both ends of the rod-shaped rack. One of the wheels 98 is mounted to the second end of the first tie rod, and the other of the wheels 98 is also mounted to the second end of the second tie rod.

Driver's turning of the steering wheel 91 causes the steering shaft 92 coupled to the steering wheel 91 to turn. This rotary motion, i.e. torque, of the steering shaft 92 is transformed to linear motion of the rack of the rack axle 97. This linear motion of the rack of the rack axle 97 causes the wheels 98 to steer via the respective first and second tie rods. The steering angle of each of the wheels 98 is determined based on the axial displacement of the rack of the rack axle 97.

The electric power steering apparatus 8 includes, for example, a motor 80, a deceleration gear mechanism 89, the torque sensor 94, and a motor control apparatus 10 including an electronic control unit (ECU).

The motor 80 is capable of outputting assist torque for assisting the driver's turning operation of the steering wheel 91. Specifically, the motor 80 is designed as, for example, a three-phase brushless motor comprised of, for example, a stator 80a, a rotor 80b, a shaft 85, a substantially circular plate-like magnet 86, and an unillustrated magnetic field member, such as permanent magnets, a field coil, and the like. The motor 80 is configured to rotate the rotor 80b together with the shaft 85 when driven.

The deceleration gear mechanism 89 serves as, for example, a power transfer mechanism, and includes, for example, a first gear coupled to a first end of the shaft 85 of the motor 80, and a second gear engaged with the first gear and mounted to the steering shaft 92. For example, the deceleration gear mechanism 89 is operative to transfer assist torque generated based on the turning of the shaft 85 of the motor 80 to the steering shaft 92 while decelerating the rotational speed of the motor 80, i.e. increasing the assist torque generated by the motor 80 by a predetermined gear ratio between the first gear and the second gear.

Specifically, the electric power steering apparatus 8 is configured such that the motor control apparatus 10 causes the motor 80 to generate assist torque based on steering torque measured by the torque sensor 94 and/or vehicle operating condition signals. The vehicle operating condition signals, which include, for example, the speed of the vehicle V, represent the operating conditions of the vehicle V, and are sent from the other in-vehicle control devices, such as the other electronic control units (ECUs), via an in-vehicle network, such as a controller area network (CAN) bus.

Specifically, the electric power steering apparatus 8 according to the first embodiment is designed as a shaft assist system for assisting the turning of the steering shaft 92 based on the assist torque generated by the motor 80. The electric power steering apparatus 8 according to the first embodiment can be designed as a rack assist system for assisting the axial displacement of the rack of the rack axle 97 based on the assist torque generated by the motor 80. That is, the first embodiment is configured such that the steering shaft 92 serves as a target to be assisted, but the rack axle 97 can serve as a target to be assisted.

The stator 80a includes, for example, an unillustrated stator core, a first coil set 81 of three-phase coils, i.e. U1, V1, and W1-phase coils, 811, 812, and 813, and a second coil set 82 of three-phase coils, i.e. U2, V2, and W2-phase coils, 821, 822, and 823. The rotor 80b, to which the shaft 85 is mounted, is configured to be rotatable relative to the stator core together with the shaft 85. The three-phase coils 811, 812, and 813 of the first coil set 81, and the three-phase coils 821, 822, and 823 of the second coil set 82 are wound in, for example, slots of the stator core and around the stator core. The magnetic field member is mounted to the rotor 80*b* for generating a magnetic field. That is, the motor 80 is capable of rotating the rotor 80*b* based on magnetic interactions between the magnetic field generated by the magnetic field member of the rotor 80*b* and a rotating magnetic field generated by the three-phase coils 811, 812, and 813 of the first coil set 81 and the three-phase coils 821, 822, and 823 of the second coil set 82 of the stator 80*a*.

Note that currents flowing through respective U1, V1, and W1 phase coils 811, 812, and 813 will be referred to as first U-, V-, and W-phase currents Ju1, Iv1, and Iw1, and similarly currents flowing through respective U2, V2, and W2 phase coils 821, 822, and 823 will be referred to as second U-, V-, and W-phase currents Iu2, Iv2, and Iw2.

Figure 2:
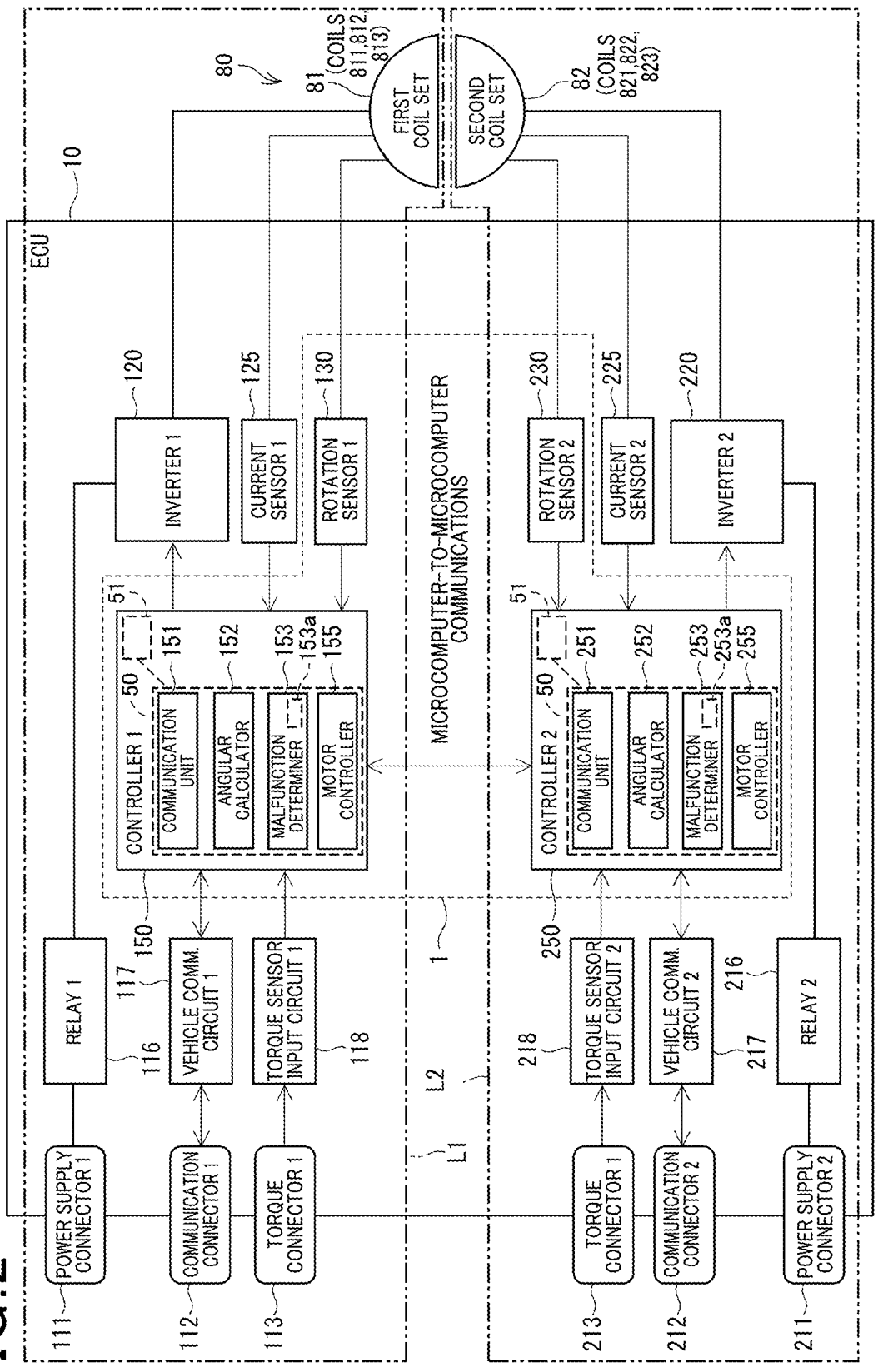
FIG. 2 is a circuit diagram schematically illustrating a motor control apparatus illustrated in FIG. 1.

Next, the following describes an example of the motor control apparatus 10 with reference to FIG. 2.

As illustrated in FIG. 2, the motor control apparatus 10 includes first and second inverters 120 and 220, first and second current sensors 125 and 225, first and second controllers 150 and 250, and first and second rotation sensors 130 and 230. The motor control apparatus 10 also includes first and second power supply relays 116 and 216, first and second vehicle communication circuits 117 and 217, and first and second torque sensor input circuits 118 and 218. Additionally, the motor control apparatus 10 has first and second power supply connectors 111 and 211, first and second vehicle communication connectors 112 and 212, and first and second torque connectors 113 and 213.

Hereinafter, the combination of the first inverter 120, first current sensor 125, first controller 150, first rotation sensor 130, first power supply relay (RELAY) 116, first vehicle communication circuit 117, first torque sensor input circuit 118, first power supply connector 111, first vehicle communication connector 112, and first torque connector 113 constitutes a first system, i.e. a first motor drive system, L1 for controlling the first coil set 81 of the motor 80. Similarly, the combination of the second inverter 220, second current sensor 225, second controller 250, second rotation sensor 230, second power supply relay (RELAY) 216, second vehicle communication circuit 217, second torque sensor input circuit 218, second power supply connector 211, second vehicle communication connector 212, and second torque connector 213 constitutes a second system, i.e. a second motor drive system, L2 for controlling the second coil set 82 of the motor 80.

That is, individual one-hundred reference numerals, such as 120 and 150, are assigned to the respective elements of the first motor drive system L1. Similarly, reference numerals in the two hundreds numbers, such as 220 and 250, are assigned to the respective elements of the second motor drive system L2. For this reason, if the last two digits of an element of the first motor drive system L1 are identical to the last two digits of an element of the second motor drive system L2, these elements are identical to each other.

Note that, in FIG. 2, the names of the respective elements of the first motor drive system L1 are represented such that the words "first" are replaced with an index "1". Similarly, the names of the respective elements of the second motor drive system L2 are represented such that the words "second" are replaced with an index "2".

Each of the first and second power supply connectors 111 and 211 has first and second terminals. The first terminal of the first power supply connector 111 is connected to the first battery 170, and the first terminal of the second power supply connector 211 is connected to the second battery 270 (see FIG. 3). The first and second power supply connectors 111 and 211 can be connected to a common power source, such as a common battery, via common wires or individual wires.

The second terminal of the first power supply connector 111 is connected to the first power supply relay 116, and the first power supply relay 116 is connected to the first inverter 120. The second terminal of the second power supply connector 211 is connected to the second power supply relay 216, and the second power supply relay 216 is connected to the second inverter 220.

Each of the first and second power supply connectors 111 and 211 includes, for example, a power supply relay comprised of, for example, a semiconductor relay or a mechanical relay.

If a power supply relay having an intrinsic diode, such as a MOSFET, is used as a component of each of the first and second power supply connectors 111 and 211, each of the first and second power supply connectors 111 and 211 preferably includes a reverse-connection protection relay with an intrinsic diode and connected between the corresponding power supply relay and the corresponding inverter while the forward direction of the intrinsic diode of the reverse-connection protection relay is opposite to the forward direction of the intrinsic diode of the corresponding power supply relay.

This would prevent a current from flowing from the first inverter 120 to the first battery 170 even if the first battery 170 were connected such that the positive terminal of the first battery 170 were connected to a common signal ground of the first motor drive system L1 and the negative terminal of the first battery 170 were connected to the first power supply connector 111. This also would prevent a current from flowing from the second inverter 220 to the second battery 270 even if the second battery 270 were connected such that the positive terminal of the second battery 270 were connected to a common signal ground of the second motor drive system L2 and the negative terminal of the second battery 270 were connected to the second power supply connector 211.

Each of the first and second vehicle communication connectors (COMMUNICATION CONNECTOR) 112 and 212 has first and second terminals. The first terminal of each of the first and second vehicle communication connectors 112 and 212 is connected to the other in-vehicle control devices via the in-vehicle area network, such as the CAN bus.

The second terminal of the first vehicle communication connector 112 is connected to the first vehicle communication circuit 117, and the first vehicle communication circuit 117 is connected to the first controller 150. The second terminal of the second vehicle communication connector 212 is connected to the second vehicle communication circuit 217, and the second vehicle communication circuit 217 is connected to the second controller 250.

Each of the first and second torque connectors 113 and 213 has first and second terminals. The first terminal of the first torque connector 113 is connected to the first sensor portion 194 of the torque sensor 94, and the first terminal of the second torque connector 213 is connected to the second sensor portion 294 of the torque sensor 94. The second terminal of the first torque connector 113 is connected to the first controller 150 via the first torque sensor input circuit 118, so that the steering torque measured by the first sensor portion 194 is input to the first controller 150 via the first torque sensor input circuit 118. The second terminal of the second torque connector 213 is connected to the second controller 250 via the second torque sensor input circuit 218, so that the steering torque measured by the second sensor portion 294 is input to the second controller 250 via the second torque sensor input circuit 218.

The first inverter 120 is designed as a known three-phase inverter and includes three pairs of high- and low-side switching elements connected in parallel to each other. The first inverter 120 is connected between the first battery 170 and the U1-, V1-, and W1-phase coils 811 to 813 via the first power supply connector 111, the first power supply relay 116, and the common signal ground of the first motor drive system L1.

The second inverter 220 is designed as a known three-phase inverter and includes three pairs of high- and low-side switching elements connected in parallel to each other. The second inverter 220 is connected between the second battery 270 and the U2-, V2-, and W2-phase coils 821 to 823 via the second power supply connector 211, the second power supply relay 216, and the common signal ground of the second motor drive system L2.

The switching elements of the first inverter 120 are controllably connected to the first controller 150. That is, on-off switching operations of the switching elements of the first inverter 120 under control of the first controller 150 enable a direct-current (DC) voltage supplied from the first battery 170 to be converted into controlled three-phase alternating-current (AC) voltages, and the three-phase AC voltages are applied to the respective U1, V1, and W1-phase coils, 811, 812, and 813.

Similarly, the switching elements of the second inverter 220 are controllably connected to the second controller 250. That is, on-off switching operations of the switching elements of the second inverter 220 under control of the second controller 250 enable a DC voltage supplied from the second battery 270 to be converted into controlled three-phase AC voltages, and the three-phase AC voltages are applied to the respective U2, V2, and W2-phase coils, 821, 822, and 823.

The first current sensor 125 is configured to measure the first U-, V-, and W-phase currents Ju1, Iv1, and Iw1 flowing through the respective U1, V1, and W1-phase coils, 811, 812, and 813, and output the measured first U-, V-, and W-phase currents Iu1, Iv1, and Iw1 to the first controller 150.

The second current sensor 225 is configured to measure the second U-, V-, and W-phase currents Iu2, Iv2, and Iw2 flowing through the respective U1, V1, and W1-phase coils, 821, 822, and 823, and output the measured second U-, V-, and W-phase currents Iu2, Iv2, and Iw2 to the second controller 250.

Figure 3:
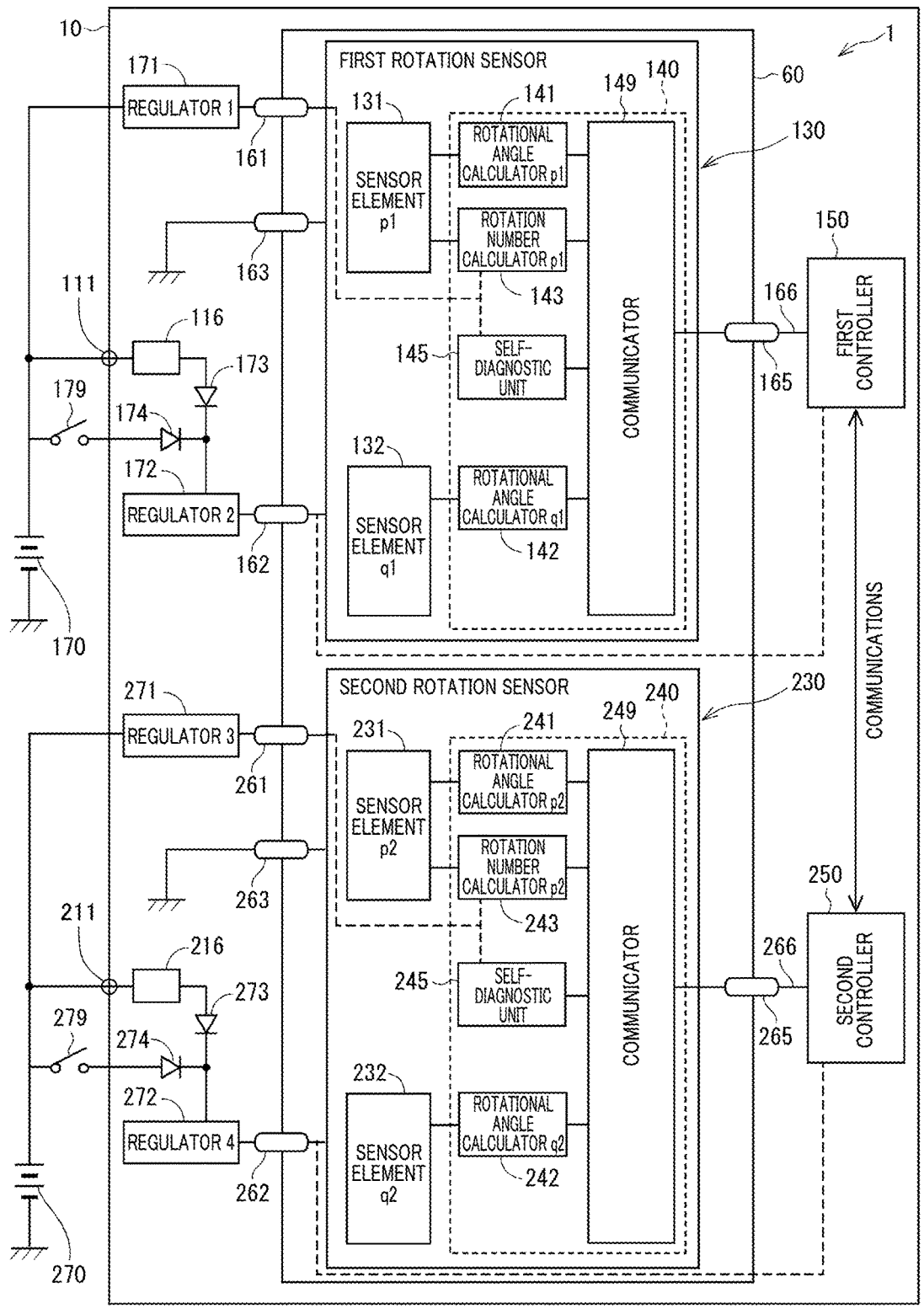
FIG. 3 is a block diagram schematically illustrating a rotation detecting apparatus illustrated in FIG. 1.

Referring to FIGS. 2 and 3, the first and second rotation sensors 130 and 230 and the first and second controllers 150 and 250 constitute the rotation detecting apparatus 1. In other words, the rotation detecting apparatus 1 is comprised of the first and second rotation sensors 130 and 230 and the first and second controllers 150 and 250.

In particular, the rotation detecting apparatus 1 is comprised of a sensor package 60. The sensor package 60 includes the first and second rotation sensors 130 and 230. The first and second rotation sensors 130 and 230 are illustrated respectively as SENSOR 1 and SENSOR 2 in FIG. 3.

As described above, the motor 80 includes the substantially circular plate-like magnet 86 that is coaxially mounted to the end surface of a second end, which is opposite to the first end, of the shaft 85.

The sensor package 60 is mounted on an unillustrated circuit board such that each of the first and second rotation sensors 130 and 230 is capable of measuring magnetic change, i.e. magnetic flux change, caused by rotation of the magnet 86 together with the shaft 85.

Packaging the first and second rotation sensors 130 and 230 in one package enables an area of the circuit board, on which these sensors 130 and 230 are mounted, to be smaller. Each of the first and second rotational sensors 130 and 230 can be individually packaged.

Figure 9:
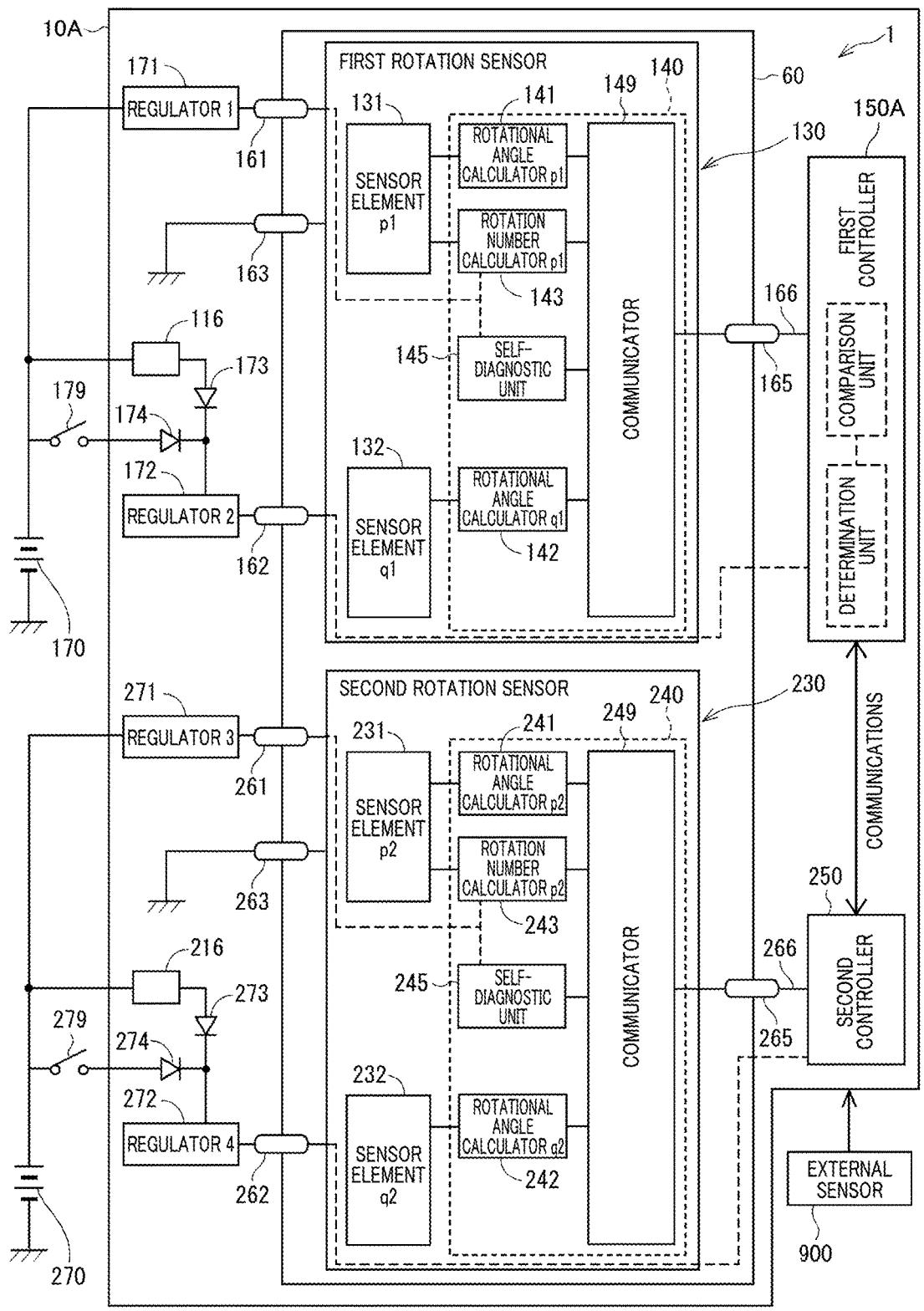
FIG. 9 is a block diagram schematically illustrating a rotation detecting apparatus according to the third embodiment of the present disclosure.

Referring to FIG. 9, the sensor package 60 has a substantially rectangular parallelepiped shape. The sensor package 60 has a pair of first and second longer sides, and has power supply terminals 161, 162, 261, and 262, mounted to the first longer side, ground terminals 163 and 263 mounted to the first longer side, and communication terminals 165 and 265 mounted to the second longer side.

The motor control apparatus 10 includes first to fourth constant-voltage circuits (REGULATORS) 171 to 174.

The power supply terminal 161, to which the first rotation sensor 130 is connected, is connected to the positive terminal of the first battery 170 via the first constant-voltage circuit 171.

The power supply terminal 162, to which the first rotation sensor 130 is connected, is connected to the positive terminal of the first battery 170 via the second constant-voltage circuit 172, a diode 173, and the first power supply relay 116. Specifically, the second constant-voltage circuit 172 is connected to the positive terminal of the first battery 170 via the diode 173, and the first power supply relay 116. The second constant-voltage circuit 172 is also connected to the positive terminal of the first battery 170 via a diode 174 and a switch 179. Each of the diodes 173 and 174 is connected between the positive terminal of the first battery 170 and the second constant-voltage source 172 to permit current flow from the first battery 170 to the second constant-voltage source 172 and prevent current flow from the second constant-voltage source 172 to the first battery 170.

Similarly, the power supply terminal 261, to which the second rotation sensor 230 is connected, is connected to the positive terminal of the second battery 270 via the third constant-voltage circuit 271.

The power supply terminal 262, to which the second rotation sensor 230 is connected, is connected to the positive terminal of the second battery 270 via the fourth constant-voltage circuit 272, a diode 273, and the second power supply relay 216. Specifically, the fourth constant-voltage circuit 272 is connected to the positive terminal of the second battery 270 via the diode 273, and the second power supply relay 216. The fourth constant-voltage circuit 272 is also connected to the positive terminal of the second battery 270 via a diode 274 and a switch 279. Each of the diodes 273 and 274 is connected between the positive terminal of the second battery 270 and the fourth constant-voltage source 272 to permit current flow from the second battery 270 to the fourth constant-voltage source 272 and prevent current flow from the fourth constant-voltage source 272 to the second battery 270.

Each of the switches 179 and 279 is configured to be turned on or off in synchronization with turn-on or turn-off of a starter switch, i.e. an ignition switch, of the vehicle V by a driver of the vehicle V. One of the switches 179 and 279 can be the ignition switch. The ignition switch will also be referred to simply as an IG, and turn-on or turn-off of each of the switches 179 and 279 will be expressed as turn-on or turn-off of the IG. In addition, a state where the IG is in the off state will be referred to as a system shutdown state.

Each of the first to fourth constant-voltage circuits 171 172, 271, and 272 is comprised of a regulator having predetermined power consumption, such as the order of several mA, which can drive the corresponding one of the first and second rotation sensors 130 and 230.

That is, each of the first and second constant-voltage circuits 171 and 172 regulates the DC voltage output from the first battery 170, thus outputting a regulated constant DC voltage to be supplied to the first rotation sensor 130. Similarly, each of the third and fourth constant-voltage circuits 271 and 272 regulates the DC voltage output from the second battery 270, thus outputting a regulated constant DC voltage to be supplied to the second rotation sensor 230.

That is, even if the IG is in the off state, so that the switches 179 and 279 are also in the off state and the first and second relays 116 and 216 are in the off state, the constant DC voltages are supplied from the first and second batteries 170 and 270 to the respective first and second rotation sensors 130 and 230 via the respective constant-voltage circuits 171 and 271.

The ground terminal 163 is connected to the common signal ground of the first motor drive system L1, and the ground terminal 263 is connected to the common signal ground of the second motor drive system L2.

The first rotation sensor 130 and the first controller 150 are communicably connected to each other via the communication terminal 165 and a communication line 166, and the second rotation sensor 230 and the second controller 250 are communicably connected to each other via the communication terminal 265 and a communication line 266.

Referring to FIG. 3, the first rotation sensor 130 includes a pair of sensor elements 131 and 132, and a circuit module 140. The second rotation sensor 230 includes a pair of sensor elements 231 and 232, and a circuit module 240.

As described above, each of the sensor elements 131, 132, 231, and 232 is designed to measure magnetic change, i.e. magnetic flux change, caused by rotation of the magnet 86.

For example, a magnetoresistive (MR) sensor element, such as an anisotropic magnetoresistive (AMR) sensor element, a giant magnetoresistive (GMR) sensor element, or a tunneling magnetoresistive (TMR) sensor element, can be used for each of the sensor elements 131, 132, 231, and 232. A Hall element also can be used for each of the sensor elements 131, 132, 231, and 232.

Same types of sensor elements or different types of sensor elements can be used as the respective first and second sensor elements of each of the first and second rotation sensors 130 and 230. Preferably, the same types of sensor elements, such as GMR sensor elements, are used as the sensor elements 131 and 231, and the other same types of sensor elements, such as Hall elements, are used as the sensor elements 132 and 232. This enables each of the first and second rotation sensors 130 and 230 to have more robust duplication.

Each of the sensor elements 131, 132, 231, and 232 can include an analog-to-digital (A/D) converter that converts a value actually measured by the corresponding sensor element into a digital measurement value, and can output the digital measurement value to the corresponding circuit module.

Hereinafter, an analog value or digital value indicative of rotational information actually measured by each of the sensor elements 131, 132, 231, and 232 and output therefrom will be referred to simply as a measurement value.

In FIG. 3, the sensor elements 131 and 231 are respectively expressed as sensor elements p1 and p2, and the sensor elements 132 and 232 are respectively expressed as sensor elements q1 and q2. Index p1 is assigned to any values based on the measurement value of the sensor element 131 ($p1$), and index q1 is assigned to any values based on the measurement value of the sensor element 132 ($q1$). Similarly, index p2 is assigned to any values based on the measurement value of the sensor element 231 ($p2$), and index q2 is assigned to any values based on the measurement value of the sensor element 232 ($q2$). If we want to collectively describe values based on measurement values of the sensor elements 131, 132, 231, and 232, no indexes are assigned to the values.

The circuit module 140 is comprised of, for example, an integrated circuit (IC) including, for example, a pair of rotational angle calculators 141 and 142 serving as, for example, a first calculator, and a rotation number calculator 143 serving as, for example, a second calculator, a self-diagnostic unit 145, and a communicator, i.e. an I/O device, 149. Similarly, the circuit module 240 is comprised of, for example, an integrated circuit (IC) including, for example, a pair of rotational angle calculators 241 and 242 serving as, for example, the first calculator, and a rotation number calculator 243 serving as, for example, the second calculator, a self-diagnostic unit 245, and a communicator, i.e. an I/O device, 249.

The rotational angle calculator 141 periodically calculates rotational angle information, i.e. first rotational information, indicative of, i.e. as a function of, rotational angle data $\theta m\_p1$ of the motor 80 based on a measurement value, which represents the magnetic change of the magnet 86, periodically measured by the sensor element 131. Then, the rotational angle calculator 141 periodically outputs, to the communicator 149, a rotational angle signal including the calculated rotational angle information indicative of the rotational angle data $\theta m\_p1$ of the motor 80.

The rotational angle calculator 142 periodically calculates rotational angle information, i.e. first rotational information, indicative of, i.e. as a function of, rotational angle data $\theta m\_q1$ of the motor 80 based on a measurement value, which represents the magnetic change of the magnet 86, periodically measured by the sensor element 132. Then, the rotational angle calculator 142 periodically outputs, to the communicator 149, a rotational angle signal including the calculated rotational angle information indicative of the rotational angle data $\theta m\_q1$ of the motor 80.

The rotational angle calculator 241 periodically calculates rotational angle information, i.e. first rotational information, indicative of, i.e. as a function of, rotational angle data $\theta m\_p2$ of the motor 80 based on a measurement value, which represents the magnetic change of the magnet 86, periodically measured by the sensor element 231. Then, the rotational angle calculator 241 periodically outputs, to the communicator 249, a rotational angle signal including the calculated rotational angle information indicative of the rotational angle data $\theta m\_p2$ of the motor 80.

The rotational angle calculator 242 periodically calculates rotational angle information, i.e. first rotational information, indicative of, i.e. as a function of, rotational angle data $\theta m\_q2$ of the motor 80 based on a measurement value, which represents the magnetic change of the magnet 86, periodically measured by the sensor element 232. Then, the rotational angle calculator 242 periodically outputs, to the communicator 249, a rotational angle signal including the calculated rotational angle information indicative of the rotational angle data $\theta m\_q2$ of the motor 80.

The rotational angle information calculated by each of the rotation angle calculators 141, 142, 241, and 242 can be any data, such as a function, indicative of the rotational angle $\theta m$ of the motor 80, or can be the rotational angle $\theta m$ of the motor 80 itself. Calculation of the rotational angle information as the rotational angle θm of the motor 80 itself or as any data about the rotational angle θm of the motor 80 will be referred to simply as calculation of the rotational angle θm of the motor 80. Note that the first embodiment uses a mechanical rotational angle of the motor 80 as the rotational angle θm of the motor 80, but can use an electrical rotational angle of the motor 80 as the rotational angle θm of the motor 80.

The rotation number calculator 143 periodically calculates rotation number information, i.e. second rotational information, indicative of, i.e. as a function of, the number of rotations of the motor 80 based on a measurement value, which represents the magnetic change of the magnet 86, periodically measured by the sensor element 131. The rotation number information measured by the sensor element 131 will be referred to as rotation number data TC_p1. Then, the rotation number calculator 143 periodically outputs, to the communicator 149, a rotation number signal including the rotation number information indicative of the rotation number data TC_p1 of the motor 80.

The rotation number calculator 243 periodically calculates rotation number information, i.e. second rotational information, indicative of, i.e. as a function of, the number of rotations of the motor 80 based on a measurement value, which represents the magnetic change of the magnet 86, periodically measured by the sensor element 231. The rotation number information measured by the sensor element 231 will be referred to as rotation number data TC_p2. Then, the rotation number calculator 243 periodically outputs, to the communicator 149, a rotation number signal including the rotation number information indicative of the rotation number data TC_p2 of the motor 80.

The rotation number information calculated by each of the rotation number calculators 143 and 243 can be any data, such as a function, indicative of the number of rotations of the motor 80 or can be the number of rotations of the motor 80 itself. Calculation of the rotation number information as the number of rotations of the motor 80 itself or any data about the number of rotations of the motor 80 will be referred to simply as calculation of the rotation number TC of the motor 80.

For example, the first embodiment is configured to divide one rotation, i.e. 360-degree rotational angle, of the motor 80 into three partial rotations, i.e. three 120-degree rotational angular ranges, which are referred to as first to third rotational angular ranges, and determine a predetermined first rotational direction as a count-up direction, and a predetermined second rotational direction, which is opposite to the first rotational direction, as a count-down direction.

Each of the rotation number calculators 143 and 243 includes, for example, a hardware counter or a software counter. That is, each of the rotation number calculators 143 and 243 is configured to (1) Increment the current counted value of the counter each time the rotational angle θm of the motor 80 changes from a current rotational angular range to an adjacent rotational angular range in the count-up direction (2) Decrement the current counted value of the counter each time the rotational angle θm of the motor 80 changes from a current rotational angular range to an adjacent rotational angular range in the count-down direction (3) Calculate the rotation number TC of the motor 80 based on the current counted value of the counter.

The counted value of the counter itself is contained in the concept of the number of rotations of the motor 80.

Counting up or down the counter each time the rotational angle θm of the motor 80 moves from a current rotational angular range to an adjacent rotational angular range in the count-up direction or the count-down direction Dividing one rotation, i.e. 360-degree rotational angle, of the motor 80 into three or more partial rotations, i.e. three or more rotational angular ranges, enables the rotational direction of the motor 80 to be identified. Dividing one rotation, i.e. 360-degree rotational angle, of the motor 80 into five partial rotations, i.e. five rotational angular ranges, enables the rotational direction of the motor 80 to be identified even if change of the rotational angle θm of the motor 80 from a current rotational angular range to an adjacent rotational angular range is skipped. Each of the rotation number calculators 143 and 243 can be configured to calculate the number of rotations of the motor 80 based on the rotational angle θm of the motor 80.

Note that the number of rotations of the motor 80 according to the first embodiment does not represent the rotational speed, i.e. revolutions per minute in rpm, of the motor 80 but represents how many times the motor 80 have turned.

The self-diagnostic unit 145 is configured to diagnose whether there is a fault, i.e. a malfunction, in the first rotation sensor 130. Specifically, the self-diagnostic unit 145 is configured to monitor whether there is a power failure including power supply fault and ground fault in each of the sensor elements 131 and 132, rotational angle calculators 141 and 142, and rotational number calculator 143.

In addition, the self-diagnostic unit 145 is configured to diagnose whether the rotational angle data θm_p1 has malfunctioned due to, for example, a malfunction that has occurred in the circuit module (IC) 140. For example, the self-diagnostic unit 145 is configured to compare the rotational angle data θm_p1 with the rotational angle data θm_q1, thus determining whether there is an internal fault, such as an offset fault, between the first set of the sensor element 131 and rotational angle calculator 141 and the second set of the sensor element 132 and rotational angle calculator 142 in accordance with the result of comparison of the rotational angle data θm_p1 with the rotational angle data θm_q1.

The self-diagnostic unit 245 is configured to diagnose whether there is a fault, i.e. a malfunction, in the second rotation sensor 230. Specifically, the self-diagnostic unit 245 is configured to monitor whether there is a power failure including power supply fault and ground fault in each of the sensor elements 231 and 232, rotational angle calculators 241 and 242, and rotational number calculator 243.

In addition, the self-diagnostic unit 245 is configured to diagnose whether the rotational angle data θm_p2 has malfunctioned due to, for example, a malfunction that has occurred in the circuit module (IC) 240. For example, the self-diagnostic unit 245 is configured to compare the rotational angle data θm_p2 with the rotational angle data θm_q2, thus determining whether there is an internal fault, such as an offset fault, between the first set of the sensor element 231 and rotational angle calculator 241 and the second set of the sensor element 232 and rotational angle calculator 242 in accordance with the result of comparison of the rotational angle data θm_p2 with the rotational angle data θm_q2.

Each of the self-diagnostic units 145 and 245 can be configured to diagnose whether there is a fault, i.e. a malfunction, in the corresponding one of the first and rotation sensors 130 and 230 using one of the other known method except for the methods set forth above.

Each of the self-diagnostic units 145 and 245 outputs the self-diagnostic result obtained thereby to the corresponding one of the communicators 149 and 249.

Note that the self-diagnostic operations carried out by the self-diagnostic unit 145 can be carried out by the first controller 150, and the self-diagnostic operations carried out by the self-diagnostic unit 245 can be carried out by the second controller 250.

The communicator 149 is configured to (1) Generate, based on the rotational angle signals including the rotational angle data θm_p1 and rotational angle data θm_q1 and the rotation number signal including the rotation number data TC_p1 of the motor 80, an output signal including the rotational angle signals and the rotation number signal (2) Output, as a frame, the output signal to the first controller 150 using a predetermined digital communication interface, such as a serial peripheral interface (SPI)

The communicator 249 is configured to (1) Generate, based on the rotational angle signals including the rotational angle data θm_p2 and rotation angle data θm_q2 and the rotation number signal including the rotation number data TCp2 of the motor 80, an output signal including the rotational angle signals and the rotation number signal (2) Output, as a frame, the output signal to the second controller 250 using a predetermined digital communication interface, such as the SPI Each of the communicators 149 and 249 of the corresponding one of the first and second sensors 130 and 230 is configured to include, as status data or a status signal, the self-diagnostic result in the output signal to be output to the corresponding one of the first and second controllers 150 and 250.

The first battery 170 according to the first embodiment is configured to continuously supply electrical power to the sensor element 131, the rotation number calculator 143, and the self-diagnostic unit 145 via the power supply terminal 161. The first battery 170 is also configured to supply electrical power to the sensor element 132, the rotational angle calculators 141 and 142, and the communicator 149 only when the first power supply relay 116 or the switch 179 is in the on state under control of, for example, the first controller 150. This results in the sensor element 132, the rotational angle calculators 141 and 142, and the communicator 149 being shut down while both the first power supply relay 116 and the switch 179 are in the off state.

The second battery 270 according to the first embodiment is configured to continuously supply electrical power to the sensor element 231, the rotation number calculator 243, and the self-diagnostic unit 245 via the power supply terminal 261. The second battery 270 is also configured to supply electrical power to the sensor element 232, the rotational angle calculators 241 and 242, and the communicator 249 only when the second power supply relay 216 or the switch 279 is in the on state under control of, for example, the second controller 250. This results in the sensor element 232, the rotational angle calculators 241 and 242, and the communicator 249 being shut down while both the second power supply relay 216 and the switch 279 are in the on state.

For example, the first controller 150 periodically sends an instruction to the first rotation sensor 130 via the communication line 166 and the command terminal 165. The first rotation sensor 130 periodically outputs, as a communication frame, the output signal to the first controller 150 via the communication terminal 165 and the communication line 166. Each frame of the output signal to be sent to the first controller 150 includes, in addition to the rotational angles θm_q1 and θm_q1, the rotation number TC1, and the status signal, a run counter signal and a cyclic redundancy check (CRC) code, i.e. CRC signal, serving as an error detection signal. The first controller 150 periodically receives the output signal from the first rotation sensor 130. The second controller 250 is configured to periodically receive the output signal sent from the second rotation sensor 230 in the same manner as the first controller 150.

In other words, the first rotation sensor 130 periodically performs a rotation measurement task to thereby measure the rotational angles θm_p1 and θm_q1 and the rotation number TC_p1 of the motor 80 and output the rotational angles θm_p1 and θm_q1 and the rotation number TC_p1 of the motor 80 as the output signal to the first controller 150. Then, the first controller 150 periodically performs a motor control task to thereby control the motor 80 in accordance with the output signal sent from the first rotation sensor 130. One rotation measurement task periodically performed by the first rotation sensor 130 will be referred to as a cycle, and one motor control task periodically performed by the first controller 150 will be referred to as a cycle. The second rotation sensor 230 and the second controller 250 are configured to be identical to the respective first rotation sensor 130 and the second controller 150.

Note that each of the first and second controllers 150 and 250 includes a run counter with an initial count value of zero, and is configured to increment the count value by 1 each time the run counter signal is sent thereto from the corresponding one of the first and second rotation sensors 130 and 230. This enables each of the first and second controllers 150 and 250 to diagnose whether communications from the corresponding one of the first and second rotation sensors 130 and 230 to the corresponding controller is normally carried out.

FIG. 4A schematically illustrates a communication frame, which is output as the output signal from each of the first and second rotation sensors 130 and 230 by for example a single communication. The communication frame includes the run counter signal (illustrated as RUN COUNTER), the rotational angle θm_pk, the rotational angle θm_qk, the rotation number TC_pk, the status signal (illustrated as STATUS), and a cyclic redundancy check (CRC) code (illustrated as CRC), serving as an error detection signal. Another error detection signal, such as a checksum signal, can be used in place of the CRC code.

Each element constituting the communication frame is comprised of a predetermined number of bits.

If the rotation number TC_q1 is calculated based on the measurement value measured by the sensor element 132, and the rotation number TC_q2 is calculated based on the measurement value measured by the sensor element 232 (see the fourth embodiment described later), as illustrated in FIG. 4B, the communication frame includes the run counter signal, which is illustrated as RUN COUNTER, the rotational angle θm_pk, the rotational angle θm_qk, the rotation number TC_pk, the rotation number TC_qk, the status signal, and the CRC code.

The number of bits of each element constituting the communication frame and the order of the elements in the communication frame can be variably set. Note that the index of "k" assigned to the rotational angles θm_pk and θm_qk and the rotation numbers TC_pk and TC_qk is set to 1 when the communication frame is output from the first rotation sensor 130, and set to 2 when the communication frame is output from the second rotation sensor 230.

Hereinafter, the output signal output from the first rotation sensor 130 will be referred to as a first output signal, and the output signal output from the second rotation sensor 230 will be referred to as a second output signal.

Each of the first and second controllers 150 and 250 is comprised of a microcomputer including, for example, a CPU 50 and a memory unit 51 including a ROM and a RAM. The first and second controllers 150 and 250 can be therefore called first and second microcomputers.

For example, the CPU 50 of the first controller 150 can run one or more programs, i.e. program instructions, stored in the memory unit 51, thus implementing the following functions 151, 152, 153, and 155 as software operations. As another example, the first controller 150 can include a specific hardware electronic circuit to implement the functions 151, 152, 153, and 155 as hardware operations.

Similarly, the CPU 50 of the second controller 250 can run one or more programs, i.e. program instructions, stored in the memory unit 51, thus implementing the following functions 251, 252, 253, and 255 as software operations. As another example, the second controller 250 can include a specific hardware electronic circuit to implement the functions 251, 252, 253, and 255 as hardware operations.

In particular, each of the first and second controllers 150 and 250 is capable of continuously performing operations including a shutdown operation even after turn-off of the ignition switch, and is shut down after completion of the shutdown operation.

The first controller 150 includes the communication unit 151, angular calculator 152, malfunction monitor 153, and motor controller 155, and the second controller 250 includes the communication unit 251, angular calculating unit 252, malfunction monitor 253, and motor controller 255.

The communication unit 151 is capable of communicating various pieces of information with the in-vehicle area network via the first vehicle communication connector 112 and the first vehicle communication circuit 117. The communication unit 151 also receives measurement information sent from the first sensor portion 194 of the torque sensor 94, and measurement information sent from the first current sensor 125. The communication unit 151 also sends instructions to the first rotation sensor 130, and receives the first output signals output from the first rotation sensor 130 in response to the instructions. The communication unit 151 is also capable of communicating with the second controller 250 to thereby obtain, from the second controller 250, various pieces of information.

The angular calculator 152 calculates a rotational angle $\theta m1$ of the motor 80 in accordance with the rotational angle signal included in the first output signal received from the first rotation sensor 130, and calculates a rotation number TC1 of the motor 80 in accordance with the rotation number signal included in the first output signal received from the first rotation sensor 130.

The angular calculator 152 also calculates, based on the rotational angle $\theta m1$ and the rotation number value TC1, a steering angle $\theta s1$ of the steering shaft 92 and a tire angle $\theta t1$ of each wheel 98. One or more calculated values $\theta m1$, TC1, $\theta s1$, and $\theta t1$ are used for the motor control apparatus 10 for controlling the motor 80 and/or the electric power steering apparatus 8 for assisting the driver's steering operation of the steering wheel 91 and/or automatically controlling the steering of the vehicle V. If the electric steering apparatus 8 is configured not to perform the automatic control of the steering of the vehicle V, calculation of the tire angle $\theta t1$ can be omitted.

In particular, the steering angle $\theta s1$ represents a rotational angle of the second portion 92b of the steering shaft 92. Because the second portion 92b of the steering shaft 92 is coupled to the shaft 85 of the motor 80 via the deceleration gear mechanism 89, the angular calculator 152 calculates, as the steering angle $\theta s1$ of the steering shaft 92, the rotational angle of the second portion 92b of the steering shaft 92 as a function of the rotational angle $\theta m1$, the rotation number TC1, and the gear ratio of the deceleration gear mechanism 89. In addition, because the angular calculator 152 can convert the rotational angle of the second portion 92b of the steering shaft 92 into a rotational angle of the first portion 92a of the steering shaft 92 using the twist of the torsion bar 94a, the angular calculator 152 can calculate the rotational angle of the first portion 92a of the steering shaft 92 as the steering angle $\theta s2$ of the steering shaft 92.

The malfunction monitor 153, which includes a comparator 153a, is configured to monitor whether there is a malfunction in, for example, the first rotation sensor 130. How the malfunction monitor 153 performs a part of a malfunction monitoring routine will be described later.

The motor controller 155 is configured to generate drive signals for the respective switching elements of the first inverter 120 in accordance with various pieces of information input to the first controller 150, and output the drive signals to the respective switching elements of the first inverter 120, thus controlling on-off switching operations of the switching elements of the first inverter 120. This enables the DC voltage supplied from the first battery 170 to be converted into controlled three-phase AC voltages, and the three-phase AC voltages are applied to the respective U1, V1, and W1-phase coils, 811, 812, and 813, thus rotating the motor 80.

The communication unit 251 is capable of communicating various pieces of information with the in-vehicle area network via the second vehicle communication connector 212 and the second vehicle communication circuit 217. The communication unit 251 also receives measurement information sent from the second sensor portion 294 of the torque sensor 94, and measurement information sent from the second current sensor 225. The communication unit 251 also sends instructions to the second rotation sensor 230, and receives the second output signals output from the second rotation sensor 230 in response to the instructions. The communication unit 251 is also capable of communicating with the first controller 150 to thereby obtain, from the first controller 150, various pieces of information. Hereinafter, communications between the first and second controllers 150 and 250 can also called computer-to-computer communications.

The angular calculating unit 252 calculates a rotational angle $\theta m2$ of the motor 80 in accordance with the rotational angle signal included in the second output signal received from the second rotation sensor 230, and calculates a rotation number value TC2 of the motor 80 in accordance with the rotation number signal included in the second output signal received from the second rotation sensor 230.

The angular calculating unit 252 also calculates, based on the rotational angle $\theta m2$ and the rotation number value TC2, a steering angle $\theta s2$ of the steering shaft 92 and a tire angle $\theta t2$ of each wheel 98. One or more calculated values $\theta m2$, TC2, $\theta s2$, and $\theta t2$ are used for the motor control apparatus 10 for controlling the motor 80 and/or the electric power steering apparatus 8 for assisting the driver's steering operation of the steering wheel 91 and/or automatically controlling the steering of the vehicle V. If the electric steering apparatus 8 is configured not to perform the automatic control of the steering of the vehicle V, calculation of the tire angle $\theta t2$ can be omitted.

The malfunction monitor 253, which includes a comparator 253a, is configured to monitor whether there is a malfunction in, for example, the second rotation sensor 230. How the malfunction monitor 253 performs a part of the malfunction monitoring routine will be described later.

The motor controller 255 is configured to generate drive signals for the respective switching elements of the second inverter 220 in accordance with various pieces of information input to the second controller 250, and output the drive signals to the respective switching elements of the second inverter 220, thus controlling on-off switching operations of the switching elements of the second inverter 220. This enables the DC voltage supplied from the second battery 270 to be converted into controlled three-phase AC voltages, and the three-phase AC voltages are applied to the respective U2, V2, and W2-phase coils, 821, 822, and 823, thus rotating the motor 80.

No malfunctions having occurred in the first and second rotation sensors 130 and 230 result in the rotational angles θm1 and θm2 being substantially identical to each other. Note that, if the rotational angles θm1 and θm2 are different by a mere measurement error from each other, the rotational angles θm1 and θm2 are regarded as being substantially identical to each other. The other measurement values, such as the rotation numbers TC1 and TC2 or the steering angles θs1 and θs2, have a relationship similar to the relationship between the rotational angles θm1 and θm2.

As described above, the first and second controllers 150 and 250 are configured to communicate various pieces of information with each other using the microcomputer-to-microcomputer communications. For this reason, each of the first and second controllers 150 and 250 can be configured to use pieces of information about the rotational angles θm based on the measurement values measured by the respective four sensor elements 131, 132, 231, and 232, and use pieces of information about the rotation numbers TC based on the measurement values measured by the respective two sensor elements 131 and 231.

Specifically, each of the first and second controllers 150 and 250 can be configured to use (1) The rotational angle data θm_p1 and the rotation number data TC_p1 based on the measurement value measured by the sensor element 131

(2) The rotational angle data θm_q1 based on the measurement value measured by the sensor element 132

(3) The rotational angle data θm_p2 and the rotation number data TC_p2 based on the measurement value measured by the sensor element 231

(4) The rotational angle data θm_q2 based on the measurement value measured by the sensor element 232

Note that the neutral position of the steering wheel 91 is defined as the position of the steering wheel 91 when the vehicle V incorporating therein the electronic power steering apparatus 8 is travelling in a straight line.

For example, each of the first and second controllers 150 and 250 learns the neutral position of the steering wheel 91 while the vehicle V is travelling in a straight line at a constant speed for a predetermined time. Each of the first and second controllers 150 and 250 stores the learned neutral position of the steering wheel 91 in the corresponding memory unit 51.

That is, each of the first and second controllers 150 and 250 calculates the steering angle θs of the steering shaft 92 relative to the neutral position of the steering wheel 91 as a function of the rotational angle θm, the rotation number TC, and the gear ratio of the deceleration gear mechanism 89. This configuration to calculate the steering angle θs of the steering shaft 92 enables steering sensors to be eliminated from the electronic power steering apparatus 8.

A driver's operation of the steering wheel 91 while the ignition switch is in the off state may cause the steering angle θs to change. This change of the steering angle θs may cause the rotational angle θm and/or the rotation number TC of the motor 80 to change.

In this case, if each of the first and second controllers 150 and 250 can detect the rotation number TC of the motor 80 during the off state of the ignition switch and the rotational angle θm at the next turn-on of the ignition switch that has been turned off, the corresponding one of the first and second controllers 150 and 250 is capable of calculating a value of the steering angle θs at the next turn-on timing as a function of (1) The rotation number TC during the off state of the ignition switch (2) The rotational angle θm at the next turn-on of the ignition switch (3) Neutral position of the steering wheel 91 stored in the corresponding memory unit 51

For this reason, each of the first and second rotation sensors 130 and 230, i.e. each of the rotation number calculators 143 and 243, according to the first embodiment is configured to continuously calculate the rotation number TC while the ignition switch IG is in the off state. This enables relearning of the neutral position of the steering wheel 91 at the next turn-on of the ignition switch that has been turned off to be eliminated. Note that it is unnecessary to continuously calculate the rotational angle θm during the off state of the ignition switch, but to detect a value of the rotational angle θm at the turn-off timing of the ignition switch. For this reason, each of the rotational angle calculators 141, 142, 241, and 242 is configured not to calculate the rotational angle θm during the turn-off state of the ignition switch.

As described above, the first and second controllers 150 and 250 are shutdown while the ignition switch is in the off state. For this reason, it is necessary for each of the first and second rotation sensors 130 and 230 to monitor whether there is a malfunction in at least one of the first and second rotation sensors 130 and 230. However, during the off state of the ignition switch, it is necessary to prevent the first and second batteries 170 and 270 from being exhausted while the ignition switch is turned off. To prevent the first and second batteries 170 and 270 from running out during the turn-off of the ignition switch, each of the first and second rotation sensors 130 and 230 is desired to perform a minimum malfunction monitoring operation while stopping calculation of the rotational angle θm.

For addressing such a desire, each of the first and second controllers 150 and 250 is configured to perform a part of the malfunction monitoring routine that determines, at the timing when the ignition switch is changed from the off state to the on state, whether there is a malfunction having occurred during the turn-off state of the ignition switch in at least one of the first and second rotation sensors 130 and 230.

The following describes the malfunction monitoring routine carried out by the motor control apparatus 10 with reference to the joint timing chart illustrated in FIGS. 5A to 5E. FIG. 5A schematically illustrates how the ignition switch (IG) is turned on or off over time, FIG. 5B schematically illustrates how each of the first and second controllers 150 and 250 is activated over time, and FIG. 5C schematically illustrates how the rotational angle θm is calculated by each of the first and second rotation sensors 130 and 230 over time. Additionally, FIG. 5D schematically illustrates how the rotation number TC is calculated by each of the first and second rotation sensors 130 and 230 over time, and FIG. 5E schematically illustrates how the malfunction monitoring routine is carried out over time.

While each of the first and second batteries 170 and 270 is not connected to the motor control circuit 10, calculation of the rotational angle θm and calculation of the rotation number TC are not carried out, because no electrical power is supplied to the first and second rotation sensors 130 and 230.

Connecting first and second batteries 170 and 270 to each of the first and second rotation sensors 130 and 230 at time x1 enables electrical power to be supplied from the corresponding one of the first and second batteries 170 and 270 to the corresponding one of the rotation number calculators 143 and 243 via the corresponding one of the power supply terminals 161 and 261. This therefore enables each of the rotation number calculators 143 and 243 to start calculation of the rotation number TC although the ignition switch is in the off state from the time x1 to time x2. In other words, no calculation of the rotational angle θm is carried out for the period from the time x1 to the time x2 during which the ignition switch is in the off state. Additionally, because each of the self-diagnostic units 145 and 245 is energized based on the electrical power supplied from the corresponding one of the first and second batteries 170 and 270 similar to the rotation number calculators 143 and 243, each of the self-diagnostic units 145 and 245 performs a self-malfunction monitoring subroutine included in the malfunction monitoring routine to thereby monitor whether there is a malfunction in the rotation number TC calculated by the corresponding one of the rotation number calculators 143 and 243 for the period from the time x1 to the time x2.

Turning on the ignition switch at the time x2 enables electrical power to be supplied from each of the first and second batteries 170 and 270 to the corresponding one of the rotational angle calculators 141 and 241 via the corresponding one of the power supply terminals 162 and 262 and the corresponding one of the switches 179 and 279. This therefore enables each of the rotational angle calculators 141 and 241 to start calculation of the rotational angle θm.

Additionally, turning on the ignition switch at the time x2 enables electrical power to be supplied from each of the first and second batteries 170 and 270 to the corresponding one of the first and second controllers 150 and 250. This enables each of the first and second controllers 150 and 250 to activate the electric power steering apparatus 8.

In addition, each of the first and second controllers 150 and 250, when energized at the time x2, sends an instruction for requesting sending of an output signal to the corresponding one of the first and second rotation sensors 130 and 230 via the corresponding one of the communication units 151 and 251.

When receiving the instruction, each of the first and second rotation sensors 130 and 230 sends the corresponding one of the first and second output signals, which includes the rotational angle θm_pk, the rotational angle θm_qk, the rotation number TC_pk, and other data set forth above to the corresponding one of the first and second controllers 150 and 250.

The first and second controllers 150 and 250, when energized at the time x2, perform the microcomputer-to-microcomputer communications therebetween, thus each sharing the rotation number information about the rotation numbers TC1 and TC2. This enables each of the first and second controllers 150 and 250, i.e. its malfunction monitor 153 or 253, to perform an initial malfunction monitoring subroutine included in the malfunction monitoring routine that compares the rotation numbers TC1 and TC2 with each other to thereby check whether there is a malfunction in each of the rotation numbers TC1 and TC2 for a predetermined period, i.e. initial check period, from the time x2 to predetermined time x3.

After lapse of the initial check period from the time x2 to the time x3, each of the first and second controllers 150 and 250, i.e. its malfunction monitor 153 or 253, performs a running malfunction monitoring subroutine included in the malfunction monitoring routine that compares the rotation number TC and the rotational number θm with each other to thereby determine whether there is a malfunction in each of the rotation numbers TC until the ignition switch is turned off.

If the ignition switch is turned off at time x4, each of the first and second controllers 150 and 250 stores a current value of the rotation number TC in the corresponding memory unit 51 and the results of the above malfunction monitoring subroutines, and performs the shutdown operation, and thereafter, is shut down at time x5.

On the other hand, after energized at the time x1, each of the rotation number calculators 143 and 243 continuously calculates the rotation number TC independently of turn-off of the ignition switch at the time x4 and shutdown of the corresponding one of the first and second controllers 150 and 250 at the time x5.

The initial malfunction monitoring subroutine is configured, for example, programmed, to be carried out by each of the first and second controllers 150 and 250 each time the ignition switch is turned on.

Figure 6:
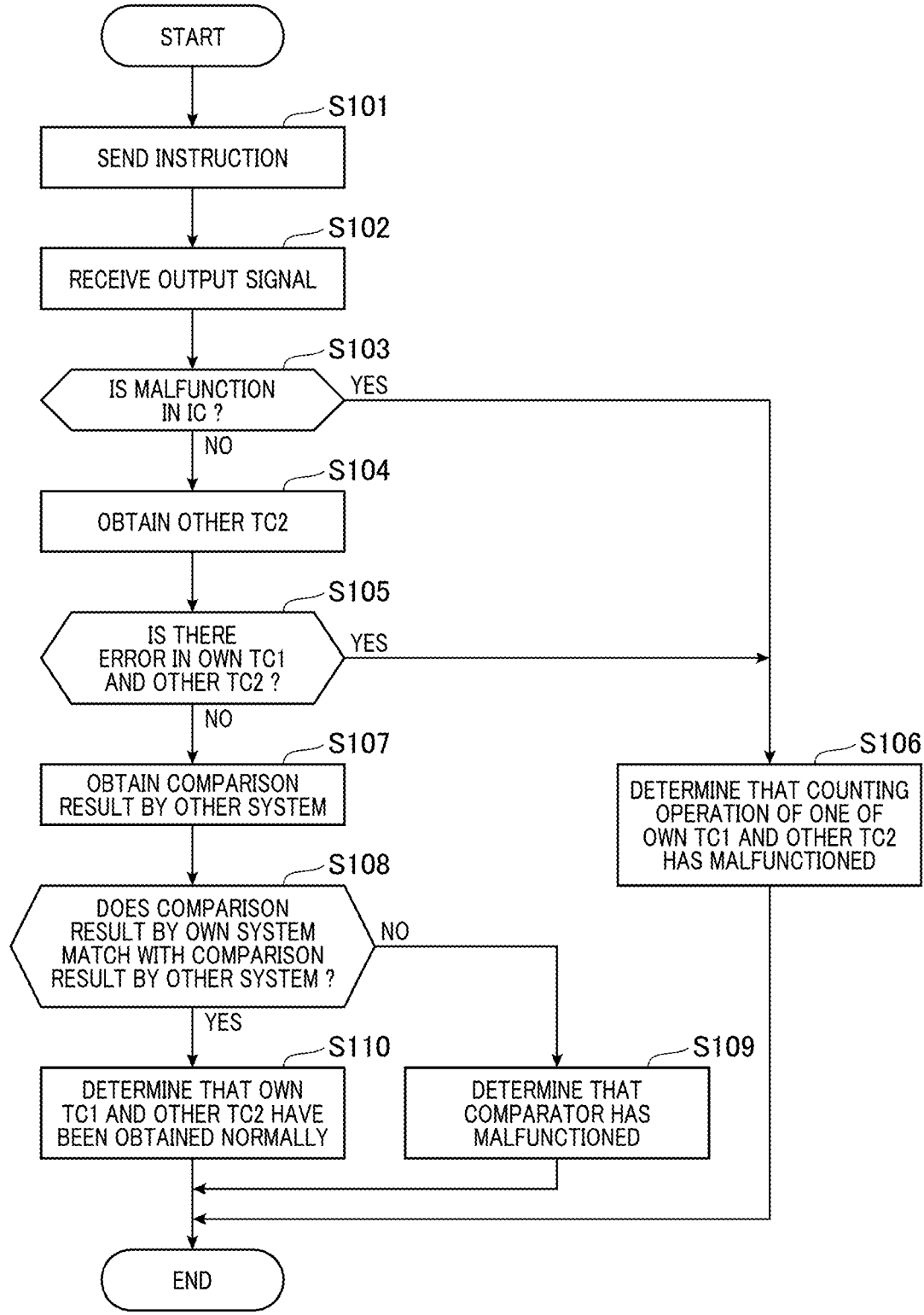
FIG. 6 is a flowchart schematically illustrating an initial malfunction monitoring subroutine included in the malfunction monitoring routine.

The following describes the initial malfunction monitoring subroutine with reference to the flowchart of FIG. 6.

Because the specific operations of the initial malfunction monitoring subroutine carried out by the first controller 150 are identical to the specific operations of the initial malfunction monitoring subroutine carried out by the second controller 250, the following describes the specific operations of the initial malfunction monitoring subroutine carried out by the first controller 150.

Note that the second controller 250 uses the rotational angle and the rotation number measured by the second rotation sensor 230 as the measurement values of the own system, and uses the rotational angle and the rotation number measured by the first rotation sensor 130 as the measurement values of the other system.

As described above, when the first controller 150 is activated based on electrical power supplied from the first battery 170 each time the ignition switch is turned, the first controller 150 performs the initial malfunction monitoring subroutine as illustrated in FIG. 6.

In step S101, the first controller 150 sends, to the first rotation sensor 130 as a first own-system sensor, the instruction for requesting sending of an output signal. In response to the instruction, the first rotation sensor 130 sends, to the first controller 150, the first output signal, which includes the rotational angle data θm_p1, the rotational angle data θm_q1, the rotation number data TC_p1, and other data set forth above. In step S102, the first controller 150 receives, from the first rotation sensor 130, the first output signal according to the instruction.

In step S103, the first controller 150 determines whether there is a malfunction in the circuit module (IC) 140 of the first sensor 130 in accordance with the first output signal received from the first rotation sensor 130. Specifically, in step S103, the first controller 150 determines whether there is a malfunction in the circuit module (IC) 140 of the first sensor 130 in accordance with at least one of the status signal, the run counter signal and the CRC signal included in the first output signal received from the first rotation sensor 130. Because the status signal represents the self-diagnostic result, the first controller 150 can easily determine whether there is a malfunction in the circuit module 140 of the first sensor 130. As described above, the first controller 150 compares the value of the run counter signal with the count value of the run counter included therein, thus easily determining whether there is a malfunction in the circuit module 140 of the first sensor 130. Additionally, the first controller 150 performs a known error check operation using the CRC code included in the first output signal to thereby monitor whether there is a malfunction in the circuit module 140 of the first sensor 130.

Upon it being determined that there is a malfunction in the circuit module 140 of the first rotation sensor 130 (YES in step S103), the initial malfunction subroutine proceeds to step S106. Otherwise, it being determined that there are no malfunctions in the circuit module 140 of the first rotation sensor 130 (NO in step S103), the initial malfunction subroutine proceeds to step S104.

In step S104, the first controller 150 communicates with the second controller 250 using the microcomputer-to-microcomputer communications to correspondingly obtain the rotation number TC2 based on the second output signal from the second rotation sensor 230.

Then, in step S105, the first controller 150, i.e. its comparator 153, compares the rotation number TC1 calculated based on the first output signal from the own-system rotation sensor 130 with the rotation number TC2 calculated based on the second output signal from the other-system rotation sensor 230 to thereby determine whether there is an error in at least one of the rotation number TC1 and the rotation number TC2 in accordance with the result of the comparison. For example, the first controller 150, i.e. its comparator 153a is configured to perform at least one of the following determination tasks (A) to (C) to thereby determine whether there is an error in at least one of the rotation number TC1 and the rotation number TC2.

The determination task (A) is configured to perform a first comparison task that compares the absolute value of the difference between the rotation numbers TC1 and TC2 with an error determination threshold TCth1, and monitor whether there is a fault in at least one of the rotation numbers TC1 and TC2 based on the result of the first comparison task. Then, the determination task (A) is configured to determine that there is an error in at least one of the rotation numbers TC1 and TC2 upon the absolute value of the difference between the rotation numbers TC1 and TC2 being larger than the error determination threshold TCth1.

The determination task (B) is configured to store a value of the rotation number TC1 immediately before the turn-off of the ignition switch in the memory unit 51 as a value TC1_b, and a value of the rotation number TC2 immediately before the turn-off of the ignition switch in the memory unit 51 as a value TC1_b. Assuming that the calculated value of the rotation number TC1 immediately after the turn-on of the ignition switch is referred to as a value TC1_a, and the calculated value of the rotation number TC2 immediately after the next turn-on of the ignition switch is referred to as a value TC2_a, the first controller 150 calculates a rotation number change ΔTC1 and a rotation number change ΔTC2 between turn-off of the ignition switch and the next turn-on of the ignition switch in accordance with the following equations (1) and (2):

$$\Delta TC1 = TC1\_a - TC1\_b \quad (1)$$

$$\Delta TC2 = TC2\_a - TC2\_b \quad (2)$$

Then, the determination task (B) is configured to perform a second comparison task that compares each of the rotation number changes ΔTC1 and ΔTC2 with a predetermined error determination threshold TCth2, and determine whether at least one of the rotation numbers TC1 and TC2 has malfunctioned in accordance with the result of the second comparison task. Specifically, the determination task (B) is configured to determine that there is an error in at least one of the rotation numbers TC1 and TC2 upon determining that the at least one of the rotation number changes ΔTC1 and ΔTC2 is more than the predetermined error determination threshold TCth2.

The determination task (C) is configured to perform a third comparison task that compares a value $\theta s11$ of the steering angle $\theta s$ calculated based on the rotation number TC1 and the rotational angle $\theta m1$ with a value $\theta s21$ of the steering angle $\theta s$ calculated based on the rotation number TC2 and the rotational angle $\theta m1$, and determine whether there is an error in at least one of the rotation number TC1 and the rotation number TC2 as a function of the result of the third comparison task.

Specifically, the determination task (C) is configured to calculate the absolute value of the difference between the value $\theta s11$ and the value $\theta s21$ of the steering angle $\theta s$, and determine whether the absolute value of the difference between the values $\theta s11$ and $\theta s21$ of the steering angle $\theta s$ is larger than an error determination threshold $\theta\_th$. The determination task (C) determines that there is an error in at least one of the rotation numbers TC1 and TC2 upon the absolute value of the difference between the values $\theta s11$ and $\theta s21$ of the steering angle $\theta s$ being larger than the error determination threshold $\theta\_th$. Note that the value $\theta s11$ of the steering angle $\theta s$ serves as, for example, first calculation information, and the value $\theta s21$ of the steering angle $\theta s$ serves as, for example, second calculation information.

Note that there may be a difference of one between the rotation numbers TC1 and TC2 although the first and second rotation sensors 130 and 230 are operating normally due to, for example, detection error. For example, when there is a difference of one between the rotation number based on the rotation number data TC_p1 and the rotation number based on the rotation number data TC_p2. In order to address such an issue, the determination task (C), which converts the rotation numbers TC1 and TC2 into the respective values $\theta s11$ and $\theta s21$ of the steering angle $\theta s$ and compares the converted values $\theta s11$ and $\theta s21$ of the steering angle $\theta s$ with each other, enables determination of whether there is an error in at least one of the rotation number TC1 and the rotation number TC2 with higher accuracy.

When it is determined that there are no errors in either the rotation number TC1 or the rotation number TC2 (NO in step S105), the initial malfunction subroutine proceeds to step S107. Otherwise, when it is determined that there is an error in at least one of the rotation number TC1 and the rotation number TC2 (YES in step S105), the initial malfunction subroutine proceeds to step S106.

In step S106, the first controller 150 determines that there is a malfunction in the counting operation of the rotation number TC carried out by at least one of the first rotation sensor 130 and the second rotation sensor 230 during the off state of the ignition switch, i.e. during the system shutdown state. In step S106, the first controller 150 sets a relearning flag to 1, because it is necessary to perform relearning of the neutral position of the steering wheel 91.

In step S107, the first controller 150 obtains, from the second controller 250, at least one of the result of the first comparison task, the result of the second comparison task, and the result of the third comparison task used by the second controller 250, i.e. its comparator 253, in step S105 using the microcomputer-to-microcomputer communications. That is, the at least one of the result of the first comparison task, the result of the second comparison task, and the result of the third comparison task obtained from the second controller 250 in step S107 corresponds to the at least one of the result of the first comparison task, the result of the second comparison task, and the result of the third comparison task used by the first controller 150 in step S105.

In step S108, the first controller 150 determines whether the at least one of the results of the first to third comparison tasks obtained thereby in step S105 matches with the corresponding at least one of the results of the first to third comparison tasks obtained by the second controller 250 in step S105.

When it is determined that the at least one of the results of the first to third comparison tasks obtained thereby in step S105 matches with the corresponding at least one of the results of the first to third comparison tasks obtained by the second controller 250 in step S105 (YES in step S108), the initial malfunction monitoring subroutine proceeds to step S110.

Otherwise, when it is determined that the at least one of the results of the first to third comparison tasks obtained thereby in step S105 does not match with the corresponding at least one of the results of the first to third comparison tasks obtained by the second controller 250 in step S105 (NO in step S108), the initial malfunction monitoring subroutine proceeds to step S109.

In step S109, the first controller 150 determines that at least one of the comparators 153a and 253a has malfunctioned. Because it is difficult to determine whether each of the rotation numbers TC1 and TC2 is normal or abnormal during the system shutdown state due to the at least one of the comparators 153a and 253a having malfunctioned, the first controller 150 determines that it is necessary to relearn the neutral position of the steering wheel 91. The first controller 150 therefore sets the relearning flag to 1 or holds the relearning flag at 1 in step S109.

On the other hand, in step S110, the first controller 150 determines that the counting operation of the rotation number TC carried out by each of the first rotation sensor 130 and the second rotation sensor 230 during the off state of the ignition switch, i.e. during the system shutdown state, has been normal. This determination that the counting operation of the rotation number TC has been normal during the system shutdown state enables the need to perform relearning of the neutral position of the steering wheel 91 to be eliminated, making it possible to calculate the steering angle $\theta s$ based on the neutral position of the steering wheel 91 before the system shutdown, i.e. before turn-off of the ignition switch.

If only one of the first and second controllers 150 and 250 is configured to perform the initial malfunction monitoring subroutine, the operations in steps S107 to S109 can be eliminated. In this modification, it is preferable that a function of monitoring whether there is a malfunction in the comparator 153a or 253a is provided in each of the first and second controllers 150 and 250.

In addition, each of the first and second controllers 150 and 250 can be configured to perform the operations in steps S104, S105, S107, S108, S109, and S110 upon the determination in step S105 being negative.

Figure 7:
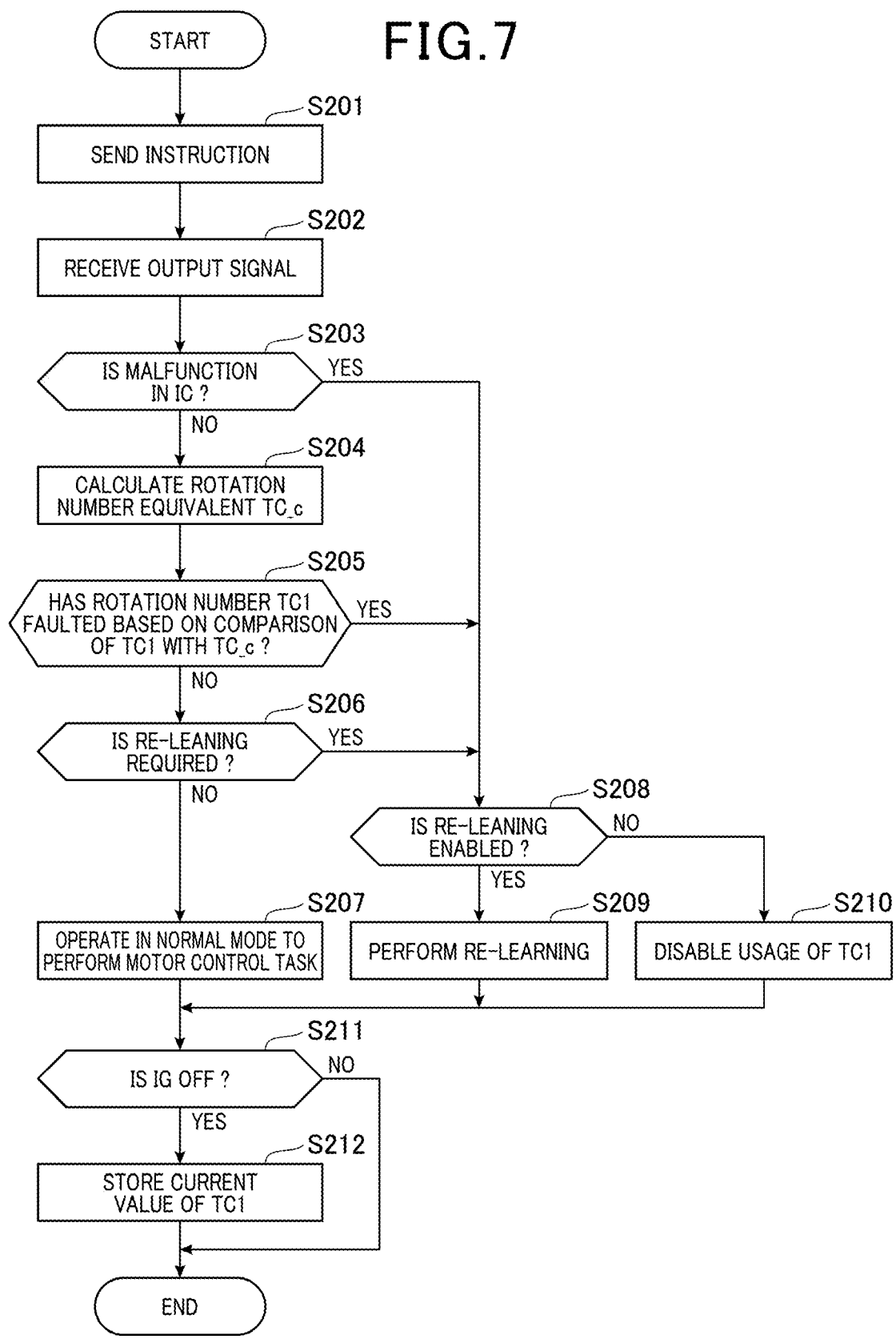
FIG. 7 is a flowchart schematically illustrating a running malfunction monitoring subroutine included in the malfunction monitoring routine.

The following describes the running malfunction monitoring subroutine with reference to the flowchart of FIG. 7. The running malfunction monitoring subroutine is configured, for example, programmed, to be carried out by each of the first and second controllers 150 and 250 in a predetermined period while the ignition switch is in the on state.

Because the specific operations of the running malfunction monitoring subroutine carried out by the first controller 150 are identical to the specific operations of the running malfunction monitoring subroutine carried out by the second controller 250, the following describes the specific operations of the running malfunction monitoring subroutine carried out by the first controller 150.

Because the operations in steps S201 to S203 are identical to the operations in steps S101 to S103, the descriptions of the operations in steps S201 to S203 are omitted. In particular, upon determining that there is a malfunction in the circuit module 140 of the first rotation sensor 130 (YES in step S203), the first controller 150 sets the relearning flag to 1 or holds the relearning flag to 1. Then, the running malfunction monitoring subroutine proceeds to step S208.

Otherwise, upon determining that there are no malfunctions in the circuit module 140 of the first rotation sensor 130 (NO in step S203), the first controller 150 calculates a rotation number equivalent TC_c based on the rotational angle $\theta m$ in step S204. The first controller 150 for example integrates the amount of changes of the rotational angle $\theta m$.

In particular, the first controller 150 obtains the rotational angle $\theta m1(p)$ based on the rotational angle data $\theta m\_p1$ measured by the sensor element 131, the rotational angle $\theta m1(q)$ based on the rotational angle data $\theta m\_q1$ measured by the sensor element 132, the rotational angle $\theta m2(p)$ based on the rotational angle data $\theta m\_p2$ measured by the sensor element 231, and the rotational angle $\theta m2(q)$ based on the rotational angle data $\theta m\_q2$ measured by the sensor element 232. For this reason, the first controller 150 can identify one of the rotational angles $\theta m1(p)$, $\theta m1(q)$, $\theta m2(p)$, and $\theta m2(q)$ as an abnormal value using a majority rule.

That is, in step S204, the first controller 150 is configured to monitor whether there is an error in at least one of the rotational angles $\theta m1(p)$, $\theta m1(q)$, $\theta m2(p)$, and $\theta m2(q)$ using a known error determining method, such as the majority rule. Then, the first controller 150 can be configured to use, as the normal rotational angle $\theta m$, one of the rotational angles $\theta m1(p)$, $\theta m1(q)$, $\theta m2(p)$, and $\theta m2(q)$, which is determined to be normal, for calculating the rotation number equivalent TC_c. The first controller 150 can be configured to use an average value of at least some of the rotational angles $\theta m1(p)$, $\theta m1(q)$, $\theta m2(p)$, and $\theta m2(q)$, which are determined to be normal, for calculating the rotation number equivalent TC_c.

Following the operation in step S204, the first controller 150 compares the rotation number TC1 with the rotation number equivalent TC_c, and determines whether the rotation number TC1 has faulted based on the result of the comparison in step S205. In step S205, it is assumed that the rotation number equivalent TC_c is normal because the rotation number equivalent TC_c is calculated based on the normal rotational angle $\theta m$.

Specifically, upon determining that the absolute value of the difference between the rotation number TC1 and the rotation number equivalent TC_c is more than an error determination threshold TCth3, the first controller 150 determines that the rotation number TC1 has faulted (YES in step S205). Then, the first controller 150 sets the relearning flag to 1 or holds the relearning flag to 1. Then, the running malfunction monitoring subroutine proceeds to step S208.

Otherwise, upon determining that the absolute value of the difference between the rotation number TC1 and the rotation number equivalent TC_c is equal to or less than the malfunction determination threshold TCth3, the first controller 150 determines that the rotation number TC1 is a normal value, i.e. determines that no errors have been included in the rotation number TC1 (NO in step S205). Then, the running malfunction monitoring subroutine proceeds to step S206.

In step S204, the first controller 150 can calculate the steering angle θs based on the rotation number TC1 and the rotational angle θm, and also integrate values of the rotational angle θm to thereby calculate a steering angle equivalent θs_c1 without the rotation number TC1. Then, in step S205, the first controller 150 can compare the steering angle θs with the steering angle equivalent θs_c1 in place of the comparison of the rotation number TC1 with the rotation number equivalent TC_c, thus determining whether the rotation number TC1 has faulted based on the result of the comparison of the steering angle θs with the steering angle equivalent θs_c1.

In step S206, the first controller 150 determines whether relearning of the neutral position of the steering wheel 91 is needed in accordance with, for example, the value of the relearning flag.

Upon it being determined that relearning of the neutral position of the steering wheel 91 is needed because of the value of the relearning flag is set to 1 (YES in step S206), the running malfunction monitoring subroutine proceeds to step S208.

Otherwise, upon it being determined that relearning of the neutral position of the steering wheel 91 is unneeded because of the value of the relearning flag is set to an initial value of 0 (NO in step S206), the running malfunction monitoring subroutine proceeds to step S207.

In step S207, the first controller 150 operates in a normal control mode for the motor 80 to perform a current cycle of the motor control task. Specifically, the first controller 150 calculates the steering angle θs1 in accordance with the rotational angle θm1 and the rotation number TC1 calculated based on the first output signal sent from the first rotation sensor 130 in the current cycle of the rotation measurement task.

Otherwise, upon determining that there is a malfunction in the circuit module 140 of the first rotation sensor 130 (YES in step S203) or the rotation number TC1 is incorrect (YES in step S205) or the relearning of the neutral position of the steering wheel 91 is needed (YES in step S206), the first controller 150 determines whether to enable relearning of the neutral position of the steering wheel 91 in step S208. As described above, the first controller 150 is capable of learning the neutral position of the steering wheel 91 on the condition that the vehicle V is travelling in a straight line at a constant speed for a predetermined time.

Upon determining that relearning of the neutral position of the steering wheel 91 is enabled (YES in step S208), the first controller 150 performs relearning of the neutral position of the steering wheel 91 and stores the relearned neutral position of the steering wheel 91 in the memory unit 51 in step S209. In step S209, the first controller 150 also resets the relearning flag to 0.

Otherwise, upon determining that relearning of the neutral position of the steering wheel 91 is not enabled (NO in step S208), the first controller 150 disables the usage of the rotation number TC1 in the current cycle of the motor control task in step S210. This results in no calculation of the steering angle θs1 in accordance with the rotational angle θm1 and the rotation number TC1 in the current cycle of the rotation measurement task.

Note that each of the first and second controllers 150 and 250, which is performing the automatic control of the electric steering apparatus 8, is configured to stop the automatic control of the electric steering apparatus 8 if there is a fault in at least one of the corresponding rotational angle θm and the rotation number TC. For example, upon determining that relearning of the neutral position of the steering wheel 91 is required due to a fault in the rotation number TC1, the first controller 150 terminates the automatic control of the electric steering apparatus 8. In contrast, if there is an error in the rotation number TC1 while, for example, the first controller 150 is performing a current cycle of the motor control task in the normal mode, the first controller 150 can be capable of continuously performing the automatic control of the electric steering apparatus 8 as long as the steering angle θs_c1 is calculated normally based on the rotational angle θm1 and the first controller 150 has reliably detected the occurrence of such an error.

Additionally, the first controller 150, which is performing autonomous driving control of the vehicle V, is configured to stop the autonomous driving control of the vehicle V upon determining that it is necessary to re-learn the neutral position of the steering wheel 91 due to an error in the rotational number TC1.

Following the operation in step S207 or S209 or S210, the first controller 150 determines whether the ignition switch has been turned off in step S211. Upon determining that the ignition switch is not in the off state (NO in step S211), the first controller 150 skips the following operation in step S212, and terminates the running malfunction monitoring subroutine. Otherwise, upon determining that the ignition switch is in the off state (YES in step S211), the first controller 150 stores a current value of the rotation number TC1 in the corresponding memory unit 51 in step S212. The stored value of the rotation number TC1 is used for calculation of the rotation number change ΔTC1 by the initial malfunction monitoring subroutine when the ignition switch will be turned on.

Each of the first and second rotation sensors 130 and 230 continuously calculates the corresponding one of the rotation number TC1 and the rotation number TC2 during the ignition switch being off. This eliminates the need to re-learn the neutral position of the steering wheel 91 upon the ignition switch being turned on again as long as at least one of the rotation number TC1 and the rotation number TC2 is normal without any malfunctions.

In addition, each of the first and second microcomputers 150 and 250 is configured to stop calculation of the corresponding one of the rotational angles θm1 and θm2 during the ignition switch being off. This configuration reduces power consumption of the motor control apparatus 10 based on DC power supplied from each of the first and second batteries 170 and 270, thus saving each of the first and second batteries 170 and 270.

As described above, the rotation detecting apparatus 1 includes a plurality of rotation sensors, i.e. the first and second rotation sensors 130 and 230 according to the first embodiment; each of the first and second rotation sensors 130 and 230 includes a corresponding one of the communicators 149 and 249. The first and second controllers 150 and 250 can share pieces of information obtained by each of the first and second rotation sensors 130 using microcomputer-to-microcomputer communications.

Thus, each of the first and second controllers 150 and 250 is capable of comparing the rotation number TC1 with the rotation number TC2 at turn-on of the ignition switch again to thereby determine whether there is an error in at least one of the rotation number TC1 and the rotation number TC2 in accordance with the result of the comparison between the rotation number TC1 and the rotation number TC2, because each of the first and second controllers 150 and 250 continuously calculates the corresponding one of the rotation number TC1 and the rotation number TC2.

This prevents erroneous values of the steering angle θs from being calculated based on the information about an erroneous value of at least one of the rotation number TC1 and the rotation number TC2.

Each of the first and second controllers 150 and 250 is configured to perform the self-malfunction monitoring subroutine whose processing load is lower than the processing load of the initial malfunction monitoring subroutine and the processing load of the running malfunction monitoring subroutine. This reduces power consumption of the rotation detecting apparatus 1 during the off state of the ignition switch.

In addition, each of the first and second rotation sensors 130 and 230 is configured to calculate a corresponding one of the rotation number TC1 and the rotation number TC2. This configuration enables, as compared with each of the first and second rotation sensors 130 and 230 calculating plural rotation numbers, the structure of each of the first and second rotation sensors 130 and 230 to be more simplified and the power consumption of each of the first and second rotation sensors 130 and 230 to be more reduced.

Each of the first and second controllers 150 and 250 can be configured to use four calculated rotational angles based on the four measurement values measured by the respective four sensor elements 131, 132, 231, and 232 using microcomputer-to-microcomputer communications. This enables whether there is a malfunction in any of the four sensor elements 131, 132, 231, and 232 to be identified.

Each of the first and second controllers 150 and 250 is configured to compare, during the running malfunction monitoring subroutine, the rotation number TC based on the corresponding one of the first and second output signals from the corresponding rotation sensor with the rotation number calculated based on a normal value of the rotational angle θm to thereby determine whether there is an error in the rotation number TC based on the result of the comparison. This configuration enables the steering angle θs of the steering shaft 92 and the tire angle θt of each wheel 98 to be continuously carried out while maintaining power consumption of the rotation detecting apparatus 1 even if there is a malfunction in a part of the rotation detecting apparatus 1. This therefore enables the rotation detecting apparatus 1 to be preferably used for advanced driver assistance systems, such as autonomous driving systems.

As described above, the rotation detecting apparatus 1 according to the first embodiment includes the first and second rotation sensors 130 and 230, and the first and second controllers 150 and 250.

The first rotation sensor 130 includes the sensor elements 131 and 132, the rotational angle calculators 141 and 142, the rotation number calculator 143, and the communicator 149.

Each of the sensor elements 131 and 132 is configured to measure rotation of a measurement target, such as the motor 80 according to the first embodiment. That is, each of the sensor elements 131 and 132 is configured to measure rotation of the motor 80 according to the first embodiment.

Each of the rotational angle calculators 141 and 142 is configured to calculate first rotational information based on a measurement value of the corresponding one of the sensor elements 131 and 132 while the switch 179 is in the on state. The switch 179 is configured to enable power supply from the first battery 170 to the corresponding rotational angle calculator while being on, and shut off power supply from the first battery 170 to the corresponding rotational angle calculator while the switch 179 being off. Information based on the rotational angle θm_p1 of the motor 80 for the sensor element 131 and information based on the rotational angle θm_q1 of the motor 80 for the sensor element 132 are each used as the first rotational information according to the first embodiment.

The rotation number calculator 143 is configured to calculate second rotational information based on the measurement value of the sensor element 131 independently of turn-on or turn-off of the switch 179. Information based on the rotation number TC_p1 of the motor 80 is used as the second rotational information according to the first embodiment.

While the switch 179 is in the on state, the communicator 149 is configured to generate the first output signal including the first rotational information based on each of the rotational angles θm_p1 and θm_q1 and the second rotational information based on the rotation number TC1, and output the first output signal to the first controller 150.

The second rotation sensor 230 includes the sensor elements 231 and 232, the rotational angle calculators 241 and 242, the rotation number calculator 243, and the communicator 249.

Each of the sensor elements 231 and 232 is configured to measure rotation of the measurement target, such as the motor 80 according to the first embodiment. That is, each of the sensor elements 231 and 232 is configured to measure rotation of the motor 80 according to the first embodiment.

Each of the rotational angle calculators 241 and 242 is configured to calculate third rotational information, which is identical to the first rotational information, based on a measurement value of the corresponding one of the sensor elements 231 and 232 while the switch 279 is in the on state. The switch 279 is configured to enable power supply from the second battery 270 to the corresponding rotational angle calculator while being on, and shut off power supply from the second battery 270 to the corresponding rotational angle calculator while the switch 279 is off. Information based on the rotational angle θm_p2 of the motor 80 for the sensor element 231 and information based on the rotational angle θm_q2 of the motor 80 for the sensor element 232 are each used as the third rotational information according to the first embodiment.

The rotation number calculator 243 is configured to calculate fourth rotational information, which is identical to the second rotational information, based on the measurement value of the sensor element 231 independently of turn-on or turn-off of the switch 279. Information based on the rotation number TC_p2 of the motor 80 is used as the fourth rotational information according to the first embodiment.

While the switch 279 is in the on state, the communicator 249 is configured to generate the second output signal including the third rotational information based on the rotational angles θm_p2 and θm_q2 and the fourth rotational information based on the rotation number TC_p2, and output the second output signal to the second controller 250.

Each of the first and second controllers 150 and 250 is configured to monitor whether there is a malfunction in at least one of the first and second rotation sensors 130 and 230 in accordance with information included in the first output signal and information included in the second output signal while the corresponding one of the switches 179 and 270 is in the on state. This configuration enables whether there is a malfunction in at least one of the first and second rotation sensors 130 and 230 to be reliably carried out based on the first and second output signals sent from the respective first and second rotation sensors 130 and 230.

Each of the first and second controllers 150 and 250 is configured to determine, as a function of the rotation number TC1 and the rotation number TC2, whether there is an error or fault in one of the rotation number TC1 and the rotation number TC2 while the corresponding one of the switches 179 and 279 is in the off state in response to when the corresponding one of the switches 179 and 279 is switched from the off state to the on state. In particular, each of the first and second controllers 150 and 250 is configured to 1. Compare the rotation number TC1 with the rotation number TC2 in response to when the corresponding one of the switches 179 and 279 is switched from the off state to the on state 2. Determine, based on the result of the comparison, whether there is an error or fault in at least one of the rotation number TC1 and the rotation number TC2 while the corresponding one of the switches 179 and 279 is in the off state This configuration enables whether there is an error in one of the rotation number TC1 and the rotation number TC2 while the corresponding one of the switches 179 and 279 is in the off state to be reliably carried out. This enables the malfunction determination task carried out by each of the first and second rotation sensors 130 and 230 for determining whether there is a malfunction in the corresponding one of the first and second rotation sensors 130 and 230 to be minimized, resulting in lower power consumption of the motor control apparatus 10.

Each of the first and second controllers 150 and 250 is configured to

1. Calculate the rotation number change $\Delta TC1$ indicative of the amount of change between a value of the rotation number TC1 immediately before turn-off of the ignition switch and a value of the rotation number TC1 immediately after the turn-off of the ignition switch 2. Calculate the rotation number change $\Delta TC2$ indicative of the amount of change between a value of the rotation number TC2 immediately before the turn-off of the ignition switch and a value of the rotation number TC2 immediately after the turn-off of the ignition switch 3. Determine whether there is an error in at least one of the rotation number TC1 and the rotation number TC2, while the corresponding one of the switches 179 and 279 is in the off state, as a function of the rotation number change $\Delta TC1$ and the rotation number change $\Delta TC2$ This configuration also enables whether there is an error in one of the rotation number TC1 and the rotation number TC2 while the corresponding one of the switches 179 and 279 is in the off state to be reliably carried out.

The first controller 150 is configured to

1. Compare a value $\theta s11$ of the steering angle $\theta s$ calculated based on the rotation number TC1 and the rotational angle $\theta m1$ with a value $\theta s21$ of the steering angle $\theta s$ calculated based on the rotation number TC2, which is different from the rotation number TC1, and the rotational angle $\theta m1$ when the switch 179 is switched from the off state to the on state 2. Determine whether there is an error in at least one of the rotation number TC1 and the rotation number TC2 as a function of the result of the comparison This configuration enables whether there is an error in at least one of the rotation number TC1 and the rotation number TC2 while the switch 179 is in the off state to be reliably carried out. Comparing the value $\theta s11$ of the steering angle $\theta s$ obtained based on the conversion of the rotation number TC1 with the value $\theta s21$ of the steering angle $\theta s$ obtained based on the conversion of the second number TC2 results in detailed checking of whether there is an error in at least one of the rotation number TC1 and the rotation number TC2.

The second controller 250 is configured to

1. Compare a value $\theta s22$ of the steering angle $\theta s$ calculated based on the rotation number TC2 and the rotational angle $\theta m2$ with a value $\theta s12$ of the steering angle $\theta s$ calculated based on the rotation number TC1, which is different from the rotation number TC2, and the rotational angle $\theta m2$ when the switch 279 is switched from the off state to the on state 2. Determine whether there is an error in at least one of the rotation number TC1 and the rotation number TC2 as a function of the result of the comparison.

This configuration enables whether there is an error in one of the rotation number TC1 and the rotation number TC2 while the switch 279 is in the off state to be reliably carried out. Comparing the value $\theta s22$ of the steering angle $\theta s$ obtained based on the conversion of the rotation number TC2 with the value $\theta s12$ of the steering angle $\theta s$ obtained based on the conversion of the second number TC1 results in detailed checking of whether there is an error in at least one of the rotation number TC1 and the rotation number TC2.

Each of the first and second controllers 150 and 250 is configured to monitor whether there is an error in at least one of the rotation number TC1 and the rotation number TC2 as a function of the rotation number TC and the rotation number equivalent TC_c obtained based on the conversion of the rotational angle $\theta m$ while a corresponding one of the switches 179 and 279 is in the on state.

Each of the first and second controllers 150 and 250 is configured to check whether there is an error in at least one of the rotation number TC1 and the rotation number TC2 as a function of the steering angle $\theta s$, which is calculated based on the rotational angle $\theta m$ and the rotation number TC, and the steering angle equivalent $\theta s\_c$, which is calculated based on the rotational angle $\theta m$ without using the rotation number TC, while a corresponding one of the switches 179 and 279 is in the on state.

If at least three rotation number calculators that respectively calculate at least three values of the rotation number TC of the motor 80 are provided in the rotation detecting apparatus 1, it is possible to identify which of the at least three rotation number calculators has malfunctioned as a comparison among the at least three values of the rotation number TC.

In contrast, the rotation detecting apparatus 1 according to the first embodiment includes two rotation number calculators 143 and 243, and each of the first and second controllers 150 and 250 is configured to determine whether there is an error in the corresponding rotation number TC as a function of the corresponding rotation number TC and the rotational angle information. Specifically, if each of the first and second controllers 150 and 250 determines that the rotational angle $\theta m$ is normal based on another monitoring task for determining whether the rotational angle $\theta m$ is normal, the corresponding one of the first and second controllers 150 and 250 determines whether there is an error in the corresponding rotation number TC as a function of the corresponding rotation number TC and the normal rotational angle θm. This enables each of the first and second controllers 150 and 250 to determine whether there is an error in the corresponding rotation number TC without using information sent from another controller.

Each of the first and second controllers 150 and 250 includes a corresponding one of the self-diagnostic units 145 and 245. The output signal output from each of the first and second rotation sensors 130 and 230 includes the status signal including the self-diagnostic result obtained from the corresponding one of the first and second rotation sensors 130 and 230. This enables each of the first and second controllers 150 and 250 to efficiently use the corresponding self-diagnostic result.

The first rotation sensor 130 includes the sensor elements 131 and 132, and the rotational angle calculators 141 and 142 provided for the respective sensor elements 131 and 132.

The second rotation sensor 230 includes the sensor elements 231 and 232, and the rotational angle calculators 241 and 242 provided for the respective sensor elements 231 and 232.

The self-diagnostic unit 145 is configured to diagnose whether there is a malfunction in the first rotation sensor 130 based on a comparison between the rotational angle data θm_p1 and the rotational angle θm_q1 calculated by the respective rotational angle calculators 141 and 142.

The self-diagnostic unit 245 is configured to diagnose whether there is a malfunction in the second rotation sensor 230 based on a comparison between the rotational angle data θm_p2 and the rotational angle θm_q2 calculated by the respective rotational angle calculators 241 and 242.

This configuration enables each of the first and second rotation sensors 130 and 230 to determine, by itself, whether there is a malfunction in the corresponding one of the first and second rotation sensors 130 and 230.

The first controller 150, in place of the self-diagnostic unit 145, can be configured to diagnose whether there is a malfunction in the first rotation sensor 130 based on a comparison between the rotational angle data θm_p1 and the rotational angle θm_q1, which are included in the output signal, calculated by the respective rotational angle calculators 141 and 142.

The second controller 250, in place of the self-diagnostic unit 245, can be configured to diagnose whether there is a malfunction in the second rotation sensor 230 based on a comparison between the rotational angle data θm_p2 and the rotational angle θm_q2, which are included in the output signal, calculated by the respective rotational angle calculators 241 and 242.

This configuration enables each of the first and second controllers 150 and 250 to determine whether there is a malfunction in the corresponding one of the first and second rotation sensors 130 and 230.

The first and second controllers 150 and 250 are provided for the respective first and second rotation sensors 130 and 230. The first and second controllers 150 and 250 can communicate information with each other. This configuration enables, even if there is a malfunction in one of the first and second controllers 150 and 250, the other of the first and second controllers 150 and 250 to continuously calculate the rotational angle θm and the rotation number TC.

The motor 80 is applied to the electric power steering apparatus 8. Each of the first and second controllers 150 and 250 is configured to calculate, based on the rotational angle θm and the rotation number value TC, the steering angle θs of the steering shaft 92 and the tire angle θt of each wheel 98 or a tire-angle equivalent value that enables the tire angle θt to be calculated.

Each of the first and second controllers 150 and 250 is configured to calculate, based on the rotational angle θm and the rotation number value TC, the steering angle θs of the steering shaft 92. This configuration enables the steering sensor to be eliminated. Each of the first and second controllers 150 and 250 is configured to calculate, based on the rotational angle θm and the rotation number value TC, the tire angle θt. This configuration enables the tire angle θt to be used for the autonomous driving control of the vehicle V.

Each of the first and second controllers 150 and 250 is configured to reliably monitor whether there is a malfunction in at least one of the first rotation sensor 130 and the second rotation sensor 230 while reducing power consumption of the motor control apparatus 10. This configuration enables, even if there is a malfunction in one of the first and second rotation sensors 130 and 230, the steering angle θs of the steering shaft 92 and the tire angle θt to be continuously calculated by the other of the first and second rotation sensors 130 and 230.

Each of the first and second microcomputers 150 and 250, which is operating normally, automatically controls the steering of the vehicle V. Each of the first and second controllers 150 and 250 is configured to stop the automatic control of the electric steering apparatus 8 if there is an error in at least one of the corresponding rotational angle θm and the rotation number TC.

Each of the first and second controllers 150 and 250 is configured to stop the automatic control of the electric steering apparatus 8 upon re-learning of the neutral position of the steering wheel 91 is needed. This prevents the automatic control of the electric steering apparatus 8 based on an erroneous neutral position of the steering wheel 91 from being performed.

Second Embodiment

Figure 8:
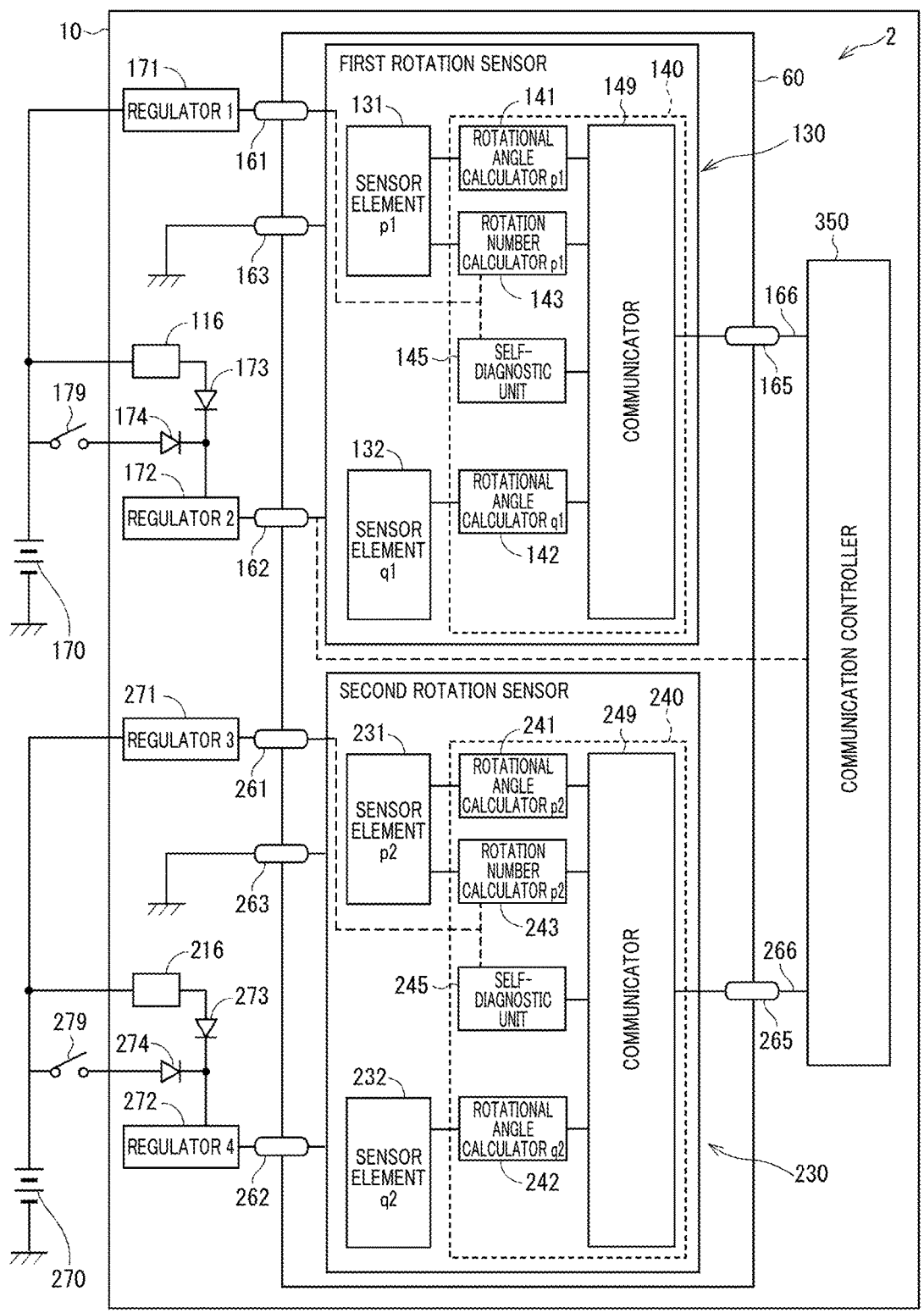
FIG. 8 is a block diagram schematically illustrating a rotation detecting apparatus according to the second embodiment of the present disclosure.

The following describes a rotation detecting apparatus 2 according to the second embodiment of the present disclosure with reference to FIG. 8.

Referring to FIG. 8, the rotation detecting apparatus 2 includes a common controller 350 for the first and second rotation sensors 130 and 230 in place of the first and second controllers 150 and 250. The common controller 350 is configured to use the rotational angle data θm_p1, the rotational angle data θm_q1, the rotational angle data θm_p2, the rotational angle data θm_q2, the rotation number data TC_p1, and the rotation number data TC_p2 for calculating the steering angle θs of the steering shaft 92 and the tire angle θt. The common controller 350 is configured to perform the initial malfunction monitoring subroutine and the running malfunction monitoring subroutine in the same manner as each of the first and second controllers 150 and 250 according to the first embodiment.

The rotation detecting apparatus 2 according to the second embodiment obtains the same advantageous effects as the advantageous effects of the rotation detecting apparatus 1.

Third Embodiment

The following describes a rotation detecting apparatus 3 according to the third embodiment of the present disclosure with reference to FIG. 9.

Referring to FIG. 9, the rotation detecting apparatus 3 according to the third embodiment is communicably connected to an external sensor 900, such as a steering sensor, for measuring a steering angle measurement θs_c2 of the steering shaft 92. That is, the rotation detecting apparatus 3 is configured to receive the steering angle measurement θs_2 of the steering shaft 92 output from the steering sensor 900. As the external sensor 900, a torque sensor can be used; the torque sensor is configured to measure a parameter, such as torque of the steering shaft 92, as a function of the steering angle measurement θs_2 of the steering shaft 92.

Preferably, the external sensor 900 according to the third embodiment is configured to measure a steering angle measurement θs_c2 of the steering shaft 92 using a predetermined measurement method different from the measurement method used by the sensing elements 131, 132, 231, and 232. In particular, the external sensor 900 according to the third embodiment is configured to measure the steering angle measurement θs_c2 of a predetermined portion of the steering shaft 92; the predetermined portion of the steering shaft 92 is different from a portion of the steering shaft 92 that are measured by the sensing elements 131, 132, 231, and 232.

Each of first and second controllers 150A and 250A, as compared with the configuration of the corresponding one of the first and second controllers 150 and 250, is additionally configured to perform, as the initial malfunction monitoring subroutine, a comparison between the steering angle measurement θs_2 and the steering angle θs calculated based on the rotation number TC and the rotational angle θm. Then, each of the first and second controllers 150A and 250A is configured to determine whether there is an error in the rotation number TC based on the result of the comparison.

For example, as illustrated in FIG. 9, the first controller 150A includes a comparison unit 150T1 that compares the steering angle measurement θs_2 with the steering angle θs calculated based on the rotation number TC and the rotational angle θm to thereby calculate the absolute value of the difference between the steering angle measurement θs_2 and the calculated steering angle θs. The first controller 150A also includes a determination unit 150T2 that determines whether the absolute value of the difference between the steering angle measurement θs_2 and the calculated steering angle θs is larger than an error determination threshold θs_th1.

Upon determining that the absolute value of the difference between the steering angle measurement θs_2 and the calculated steering angle θs is larger than the error determination threshold θs_th1, the determination unit 150T2 determines that there is an error in at least one of the rotation number TC and the external sensor, i.e. the steering sensor or torque sensor, in the external sensor 900 during the off state of the ignition switch.

Otherwise, upon determining that the absolute value of the difference between the steering angle measurement θs_2 and the calculated steering angle θs is equal to or smaller than the error determination threshold θs_th1, the determination unit 150T2 determines that there are no errors or faults in each of the rotation number TC and the external sensor 900, i.e. the steering sensor or torque sensor, during the off state of the ignition switch.

As another example, the comparison unit 150T1 is configured to store a value of the steering angle θs immediately before the turn-off of the ignition switch in the memory unit 51 as a value θs_b. Assuming that the calculated value of the steering angle θs immediately after the turn-on of the ignition switch is referred to as a value θs_a, the comparison unit 150T1 calculates a first steering angle change Δθs between turn-off of the ignition switch and the next turn-on of the ignition switch in accordance with the following equation (3):

$$\Delta\theta s = \theta s\_a - \theta s\_b \quad (3)$$

Similarly, the comparison unit 150T1 is configured to store a value of the steering angle measurement θs_2 measured by the external sensor 900 immediately before the turn-off of the ignition switch in the memory unit 51 as a value θs_c2_b. Assuming that the value of the steering angle θs measured by the external sensor 900 immediately after the turn-on of the ignition switch is referred to as a value θs_c2_a, the comparison unit 150T1 calculates a second steering angle change Δθs_c2 between turn-off of the ignition switch and the next turn-on of the ignition switch in accordance with the following equation (4):

$$\Delta\theta s\_c2 = \theta s\_c2\_a - \theta s\_c2\_b \quad (4)$$

Then, the comparison unit 150T1 compares the first steering angle change Δθs with the second steering angle change Δθs_c2 to thereby calculate the absolute value of the difference between the first steering angle change Δθs and the second steering angle change Δθs_c2.

At that time, the determination unit 150T2 determines whether the absolute value of the difference between the first steering angle change Ms and the second steering angle change Δθs_c2 is larger than an error determination threshold θs_th2.

Upon determining that the absolute value of the difference between the first steering angle change Ms and the second steering angle change Δθs_c2 is larger than the error determination threshold θs_th2, the determination unit 150T2 determines that there is an error in at least one of the rotation number TC and the external sensor 900, i.e. the steering sensor or torque sensor, during the off state of the ignition switch.

Otherwise, upon determining that the absolute value of the difference between the steering angle measurement θs_2 and the calculated steering angle θs is equal to or smaller than the error determination threshold θs_th2, the determination unit 150T2 determines that there are no errors or faults in each of the rotation number TC and the external sensor 900, i.e. the steering sensor or torque sensor, during the off state of the ignition switch.

As a further example, the comparison unit 150T1 performs, as the running malfunction monitoring subroutine, a comparison between 1. The steering angle θs calculated based on the rotation number TC1 and the rotational angle θm
2. The steering angle equivalent θs_c1 calculated based on the integrate values of the rotational angle θm
3. The steering angle measurement θs_2 measured by the external sensor 900

Then, the determination unit 150T2 determines whether there is an error in any one of the steering angle θs, the steering angle equivalent θs_c1, and the steering angle measurement θs_2 as a result of the comparison between the steering angle θs, the steering angle equivalent θs_c1, and the steering angle measurement θs_2. This enables the determination unit 150T2, i.e. the first controller 150, to identify which of the rotation number calculator 143, the rotational angle calculators 141 and 142, or the external sensor has malfunctioned in accordance with the result of the comparison, for example using majority rule.

The structure of the second controller 250A is substantially identical to the structure of the first controller 150A.

As described above, the rotation detecting apparatus 3 according to the third embodiment obtains the same advantageous effects as the advantageous effects of the rotation detecting apparatus 1.

In particular, each of the first and second controllers 150A and 250A is capable of receiving external information, measured by the external sensor 900, indicative of a parameter as a function of the rotation number TC of the steering shaft 92.

If the measurement method of the external sensor 900 for measuring the steering angle measurement θs_c2 is different from the measurement method of each of the sensing elements 131, 132, 231, and 232, this enables the rotation detecting apparatus 3 to have more robust redundancy.

In addition, if the portion of the steering shaft 92, whose rotation is measured by the external sensor 900, is different from another portion of the steering shaft 92, whose rotation is measured by at least one of the sensing elements 131, 132, 231, and 232, this also enables the rotation detecting apparatus 3 to have more robust duplication.

Fourth Embodiment

Figure 10:
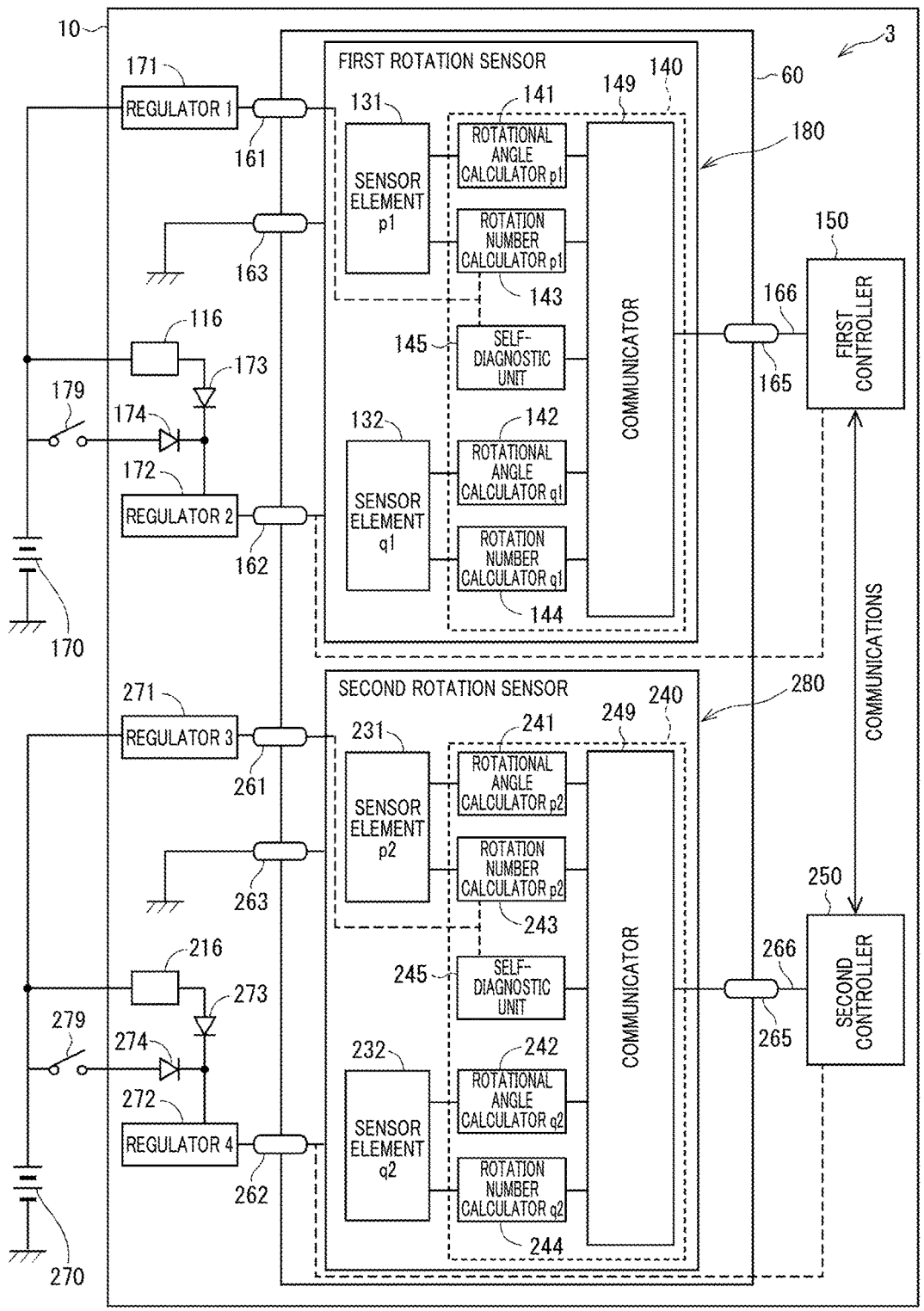
FIG. 10 is a block diagram schematically illustrating a rotation detecting apparatus according to the second embodiment of the present disclosure.

The following describes a rotation detecting apparatus 4 according to the fourth embodiment of the present disclosure with reference to FIG. 10.

Referring to FIG. 10, the rotation detecting apparatus 4 according to the fourth embodiment includes first and second rotation sensors 180 and 280.

The first rotation sensor 180 is further comprised of, in addition to the elements 131, 132, 141, 142, and 143, a rotation member calculator 144 periodically calculates rotation number information indicative of, i.e. as a function of, the number of rotations of the motor 80 based on a measurement value, which represents the magnetic change of the magnet 86, periodically measured by the sensor element 132. The rotation number information measured by the sensor element 132 will be referred to as rotation number data TC_q1. Then, the rotation number calculator 144 periodically outputs, to the communicator 149, a rotation number signal including the rotation number information indicative of the rotation number data TC_q1 of the motor 80.

Similarly, the second rotation sensor 280 is further comprised of, in addition to the elements 231, 232, 241, 242, and 243, a rotation member calculator 244 periodically calculates rotation number information indicative of, i.e. as a function of, the number of rotations of the motor 80 based on a measurement value, which represents the magnetic change of the magnet 86, periodically measured by the sensor element 242. The rotation number information measured by the sensor element 242 will be referred to as rotation number data TC_q2. Then, the rotation number calculator 244 periodically outputs, to the communicator 249, a rotation number signal including the rotation number information indicative of the rotation number data TC_q2 of the motor 80

Note that the communication frames sent from each of the first and second rotation sensors 180 and 280 to the corresponding one of the first and second controllers 150 and 250 have been described above with reference to FIG. 4B.

In particular, the self-diagnostic unit 145 is configured to compare the rotation number data TC_p1 with the rotation number data TC_q1, thus determining whether there is a malfunction in the sensor element 131 and/or the rotational angle calculator 141 in accordance with the result of comparison between the rotation number data TC_p1 with the rotation number data TC_q1.

Additionally, the self-diagnostic unit 245 is configured to compare the rotation number data TC_p2 with the rotation number data TC_q2, thus determining whether there is a malfunction in the sensor element 231 and/or the rotational angle calculator 241 in accordance with the result of comparison between the rotation number data TC_p2 with the rotation number data TC_q2.

The first controller 150, in place of the self-diagnostic unit 145, can be configured to compare the rotation number data TC_p1 with the rotation number data TC_q1, thus determining whether there is a malfunction in the sensor element 131 and/or the rotational angle calculator 141 in accordance with the result of comparison between the rotation number data TC_p1 with the rotation number data TC_q1.

Additionally, the second controller 250, in place of the self-diagnostic unit 245, can be configured to compare the rotation number data TC_p2 with the rotation number data TC_q2, thus determining whether there is a malfunction in the sensor element 231 and/or the rotational angle calculator 241 in accordance with the result of comparison between the rotation number data TC_p2 with the rotation number data TC_q2.

This configuration of the rotation detecting apparatus 4 according to the fourth embodiment obtains the same advantageous effects as the advantageous effects of the rotation detecting apparatus 1.

In particular, each of the first and second controllers 150 and 250 makes it possible to determine whether there is a malfunction in the corresponding rotation sensor in accordance with the result of comparison between the corresponding rotation number data TC_pk with the rotation number data TC_qk.

MODIFICATIONS

The present disclosure is not limited to the above described embodiments, and can be variably modified within the scope of the present disclosure.

The rotation detecting apparatus according to each of the first to fourth embodiments includes the first rotation sensor and the second rotation sensor, but can include three or more rotation sensors. The rotation detecting apparatus according to each of the first to fourth embodiments includes two sensor elements for each of the rotation sensors, but can include three or more sensor elements for each of the rotation sensors.

The rotation detecting apparatus according to each of the first to fifth embodiments includes two rotational angle calculators for each of the rotation sensors, and one or two rotation number calculators for each of the rotation sensors, but the present disclosure is not limited thereto. Specifically, the present disclosure can be configured such that each of the rotation sensors includes three or more rotational angle calculators and three or more rotation number calculators. The number of sensor elements, the number of rotational angle calculators, and the number of rotation number calculators in one of the rotation sensors can be different from the number of sensor elements, the number of rotational angle calculators, and the number of rotation number calculators in another one of the rotation sensors.

Each of the first to fourth embodiments is configured such that communications between each of the first controller 150 and 250 and the corresponding one of the first and second rotation sensors 130 and 230 are carried out through the corresponding common communication line 166 or 266, but can be carried out through different communication lines.

Each of the first to fourth embodiments is configured such that each of the first and second rotation sensors 130 and 230 and the corresponding one of the first and second microcomputers 150 and 250 communicate with one another in accordance with the SPI set forth above, but can communicate with one another in accordance with predetermined types of digital communication interfaces, such as a single edge nibble transmission (SENT) interface, as long as each type of the digital communication interfaces can include a series of, i.e. a set of, the rotational angle signal and the rotation number signal as the output signal.

In each of the first to fourth embodiments, the first rotational information obtained by, for example, the first rotation sensor 130 is comprised of information based on the rotational angles θm_p1 and θm_q1 and the second rotational information obtained by, for example the first rotation sensor 130 is comprised of information based on the rotation number TC1, but the first rotational information can include another information in addition to the information based on the rotational angles θm_p1 and θm_q1, and the second rotational information can include another information in addition to the information based on the rotation number TC1.

The rotation detecting apparatus according to each of the first to fourth embodiments is configured to detect rotation of the motor 80 as its measurement target, but can be configured to detect rotation of another measurement target.

Each of the first to fourth embodiments uses a three-phase brushless motor as the motor 80, but can use another type of motors, a power generator, or a motor-generator serves as both a motor and a power generator.

The rotation detecting apparatus according to each of the first to fourth embodiments is applied to the electric power steering apparatus 8, but can be applied to another apparatus.

In each of the first to fourth embodiments, the electric power steering apparatus 8 is automatically controllable by, for example, each of the first and second controllers 150 and 250, but cannot be automatically controllable. In each of the first to fourth embodiments, the vehicle V in which the electric power steering apparatus 8 is installed is configured to be autonomously driven, but can be configured not to be autonomously driven.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A rotation detecting apparatus comprising:
at least first and second rotation sensors, each of the first and second rotation sensors comprising:
a sensor element configured to output a measurement value indicative of rotation of a measurement target;
a first calculator configured to:
calculate first rotation information about rotation of the measurement target in accordance with the measurement value output from the sensor element while a switch is in an on state so that electrical power is supplied from a power source to the first calculator via the switch; and
stop calculation of the first rotation information while the switch is in an off state;
a second calculator configured to calculate second rotation information about rotation of the measurement target in accordance with the measurement value of the sensor element independently of the on state or off state of the switch, the second rotation information being different from the first rotational information; and
an output unit configured to generate an output signal including at least the first rotational information and the second rotational information, and output the output signal; and
a controller configured to, while the switch is in the on state, receive, as a first output signal, the output signal output from the output unit of the first rotation sensor, and receive, as a second output signal, the output signal output from the output unit of the second rotation sensor,
the controller being configured to monitor whether there is a malfunction in each of the first rotation sensor and the second rotation sensor as a function of the first output signal and the second output signal.

2. The rotation detecting apparatus according to claim 1, wherein:
the controller is configured to determine, upon the switch being changed from the off state to the on state, whether there is a malfunction in the second rotational information included in at least one of the first and second output signals during the off state of the switch as a function of:
the second rotational information included in the first output signal; and
the second rotational information included in the second output signal.

3. The rotation detecting apparatus according to claim 1, wherein:
the controller is configured to:
calculate, upon the switch being changed from the off state to the on state, a first change amount and a second change amount,
the first change amount being between:
the second rotational information included in the first output signal immediately before the switch being off state and
the second rotational information included in the first output signal immediately after the switch being on state;
the second change amount between:
the second rotational information included in the second output signal immediately before the switch being off state and
the second rotational information included in the second output signal immediately after the switch being on state; and
determine, upon the switch being changed from the off state to the on state, whether there is a malfunction in the second rotational information included in each of the first and second output signals during the off state of the switch as a function of the first change amount and the second change amount.

4. The rotation detecting apparatus according to claim 1, wherein:
the controller is configured to:
calculate, upon the switch being changed from the off state to the on state, a first rotation parameter calculated as a function of the first rotational information and the second rotational information included in the first output signal;

calculate, upon the switch being changed from the off state to the on state, a second rotation parameter calculated as a function of the first rotational information included in the first output signal and the second rotational information included in the second output signal; and monitor whether there is a malfunction in the second rotational information included in each of the first and second output signals during the off state of the switch as a function of the first and second rotational parameters.

5. The rotation detecting apparatus according to claim 1, wherein:
the controller is configured to:
calculate, upon the switch being in the on state, equivalent information based on conversion of the first rotational information included in at least one of the first and second output signals, the equivalent information being equivalent to the second rotational information included in the at least one of the first and second output signals; and
determine, upon the switch being in the on state, whether there is a malfunction in the second rotational information included in the at least one of the first and second output signals as a function of:
the second rotational information included in the at least one of the first and second output signals; and
the equivalent information based on conversion of the first rotational information included in the at least one of the first and second output signals.

6. The rotation detecting apparatus according to claim 1, wherein:
the controller is configured to:
calculate, upon the switch being in the on state, a first rotation parameter based on the first rotational information and the second rotational information included in at least one of the first and second output signals;
calculate, upon the switch being in the on state, a second rotation parameter based on the first rotational information independently of the second rotational information included in the at least one of the first and second output signals; and
determine, upon the switch being in the on state, whether there is a malfunction in the second rotational information included in each of the first and second output signals as a function of the first rotation parameter and the second rotation parameter.

7. The rotation detecting apparatus according to claim 1, wherein:
the controller is communicable with an external sensor configured to output, as a third output signal, external rotational information indicative of rotation of a rotational member that is rotated based on rotation of the measurement target; and
the controller is configured to monitor whether there is a malfunction in each of the first rotation sensor and the second rotation sensor as a function of the first output signal, the second output signal, and the third output signal.

8. The rotation detecting apparatus according to claim 1, wherein:

each of the first and second rotation sensors comprises a self-diagnostic unit configured to perform a diagnosis task to diagnose whether there is a malfunction in the corresponding one of the first and second rotation sensors;
the output unit of the first rotation sensor is configured to generate the first output signal that includes a result of the diagnostic task obtained by the self-diagnostic unit of the first rotation sensor; and
the output unit of the second rotation sensor is configured to generate the second output signal that includes a result of the diagnostic task obtained by the self-diagnostic unit of the second rotation sensor.

9. The rotation detecting apparatus according to claim 8, wherein:
the sensor element included in each of the first and second rotation sensors comprises a first sensor element and a second sensor element;
the first calculator, included in each of the first and second rotation sensors, comprises at least two first calculators provided for the respective first and second sensor elements; and
the self-diagnostic unit of each of the first and second rotation sensors is configured to:
perform a comparison between the first rotation information calculated by one of the first calculators and the first rotation information calculated by the other of the first calculators; and
monitor whether there is a malfunction in the corresponding one of the first and second rotation sensors as a function of a result of the comparison.

10. The rotation detecting apparatus according to claim 8, wherein:
the sensor element included in each of the first and second rotation sensors comprises a first sensor element and a second sensor element;
the second calculator, included in each of the first and second rotation sensors, comprises at least two second calculators provided for the respective first and second sensor elements; and
the self-diagnostic unit of each of the first and second rotation sensors is configured to:
perform a comparison between the second rotation information calculated by one of the second calculators and the second rotation information calculated by the other of the second calculators; and
monitor whether there is a malfunction in the corresponding one of the first and second rotation sensors as a function of a result of the comparison.

11. The rotation detecting apparatus according to claim 1, wherein:
the sensor element included in each of the first and second rotation sensors comprises a first sensor element and a second sensor element;
the first calculator, included in each of the first and second rotation sensors, comprises at least two first calculators provided for the respective first and second sensor elements; and
the controller is configured to monitor whether there is a malfunction in each of the first rotation sensor and the second rotation sensor based on a comparison between:
the first rotation information calculated by one of the first calculators in the corresponding one of the first rotation sensor and the second rotation sensor; and
the first rotation information calculated by the other of the first calculators in the corresponding one of the first rotation sensor and the second rotation sensor.

12. The rotation detecting apparatus according to claim 1, wherein:

the sensor element included in each of the first and second rotation sensors comprises a first sensor element and a second sensor element;

the second calculator, included in each of the first and second rotation sensors, comprises at least two second calculators provided for the respective first and second sensor elements; and the controller is configured to monitor whether there is a malfunction in each of the first rotation sensor and the second rotation sensor based on a comparison between:

the second rotation information calculated by one of the second calculators in the corresponding one of the first rotation sensor and the second rotation sensor; and the second rotation information calculated by the other of the first calculators in the corresponding one of the first rotation sensor and the second rotation sensor.

13. The rotation detecting apparatus according to claim 1, wherein:

the controller comprises a first controller and a second controller provided for the first and second rotation sensors; and the first controller and the second controller are communicably connected to each other.

14. The rotation detecting apparatus according to claim 1, wherein:

the measurement target is a motor;

the first rotational information includes a rotational angle of the motor; and the second rotational information includes a rotation number of the motor.

15. The rotation detecting apparatus according to claim 14, wherein:

the motor is installed in an electric steering apparatus of a vehicle, the vehicle including a steering shaft linked to the motor, and wheels liked to the motor; and the controller is configured to calculate, as a function of the first rotational information and the second rotational information for at least one of the first and second rotation sensors, at least one of:

a rotational angle of the steering shaft; and a parameter correlated with a rotational angle of each of the wheels.

16. The rotation detecting apparatus according to claim 15, wherein:

the controller is configured to:

perform automatic control of the electric steering apparatus in accordance with the first rotational information and the second rotational information for at least one of the first and second rotation sensors upon monitoring that there is not a malfunction in one of the first rotation sensor and the second rotation sensor; and stop the automatic control of the electric steering apparatus upon monitoring that there is a malfunction in at least one of the first rotation sensor and the second rotation sensor.

\* \* \* \* \*